US010558601B2

(12) United States Patent
    Senuma

(10) Patent No.: US 10,558,601 B2
(45) Date of Patent: Feb. 11, 2020

(54) ELECTRONIC DEVICE AND CONTROL SYSTEM

(71) Applicant: Toshiba Client Solutions CO., LTD., Koto-ku, Tokyo (JP)

(72) Inventor: Koichi Senuma, Ome Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 0 days.

(21) Appl. No.: 16/134,618

(22) Filed: Sep. 18, 2018

(65) Prior Publication Data
    US 2019/0286596 A1    Sep. 19, 2019

(30) Foreign Application Priority Data

Mar. 14, 2018  (JP) ................. 2018-046917

(51) Int. Cl.
    *G06F 13/40*    (2006.01)
    *G06F 13/42*    (2006.01)
    *H01R 107/00*   (2006.01)
    *H01R 24/60*    (2011.01)
    *H01R 25/00*    (2006.01)

(52) U.S. Cl.
    CPC ...... *G06F 13/4022* (2013.01); *G06F 13/4282* (2013.01); *G06F 2213/0042* (2013.01); *H01R 24/60* (2013.01); *H01R 25/00* (2013.01); *H01R 2107/00* (2013.01)

(58) Field of Classification Search
    None
    See application file for complete search history.

(56) References Cited

U.S. PATENT DOCUMENTS

| 7,769,914 B2 * | 8/2010 | Kim ................. G06F 13/385 710/11 |
| 7,930,463 B2 * | 4/2011 | Sekiguchi ........... G06F 13/4081 710/300 |
| 8,321,600 B2 | 11/2012 | Solomon et al. |
| 8,335,866 B2 | 12/2012 | Solomon et al. |
| 8,341,303 B2 | 12/2012 | Solomon et al. |
| 8,762,585 B2 | 6/2014 | Solomon et al. |
| 9,069,697 B2 | 6/2015 | Solomon et al. |

(Continued)

FOREIGN PATENT DOCUMENTS

| JP | 2004-62748 A | 2/2004 |
| JP | 2014-149835 A | 8/2014 |

*Primary Examiner* — Elias Mamo
(74) *Attorney, Agent, or Firm* — Knobbe, Martens, Olson & Bear, LLP

(57) ABSTRACT

According to one embodiment, an electronic device includes a receptacle, a first port, a second port, and a switch circuit. The receptacle includes pins. The pins of the receptacle are connectable to pins of a plug respectively. Each of the first and second ports communicates with the receptacle. The switch circuit switches a signal flow between the receptacle, and the first port and second port when the plug is inserted into the receptacle. The switch circuit communicates a first signal between the first port and one of a pair of first and second pins of the receptacle and a pair of third and fourth pins of the receptacle, and communicates a second signal between the second port and the other of the pair of the first and second pins and the pair of the third and fourth pins.

17 Claims, 20 Drawing Sheets

(56) References Cited

U.S. PATENT DOCUMENTS

| | | | |
|---|---|---|---|
| 2004/0260854 A1* | 12/2004 | Schade | G06F 13/385 710/305 |
| 2014/0101345 A1* | 4/2014 | Ranta | G06F 11/3051 710/16 |
| 2014/0245037 A1* | 8/2014 | Loh | G06F 1/266 713/310 |
| 2015/0254193 A1* | 9/2015 | Priest | G06F 13/385 715/835 |
| 2016/0112711 A1* | 4/2016 | Hundal | G06F 13/4282 375/240.26 |

* cited by examiner

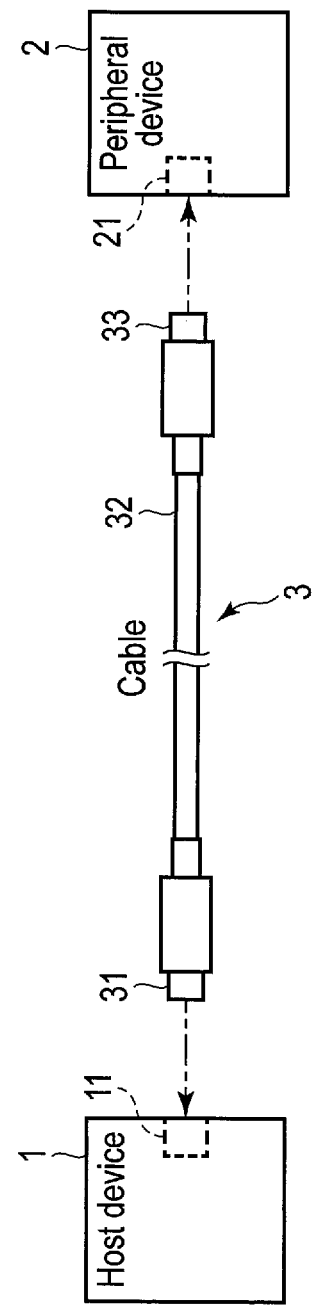
F I G. 1

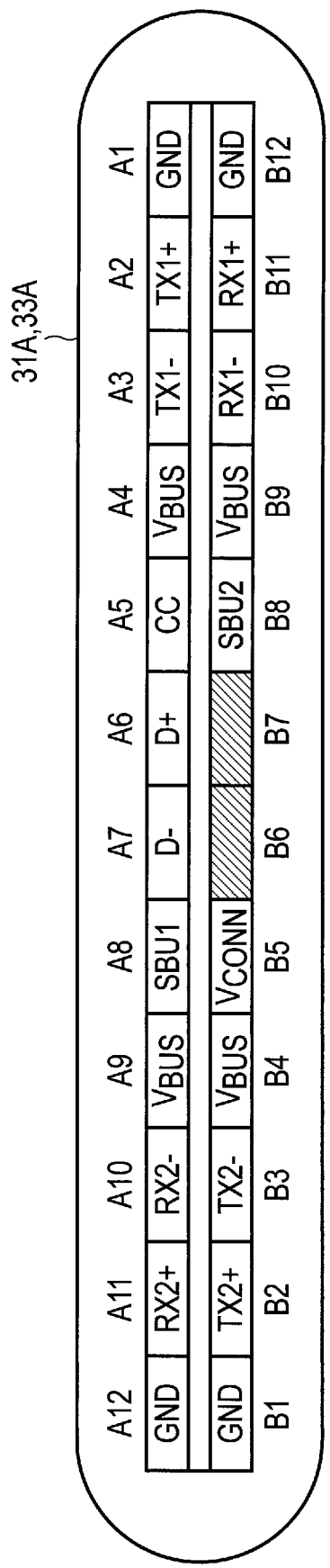
F I G. 3

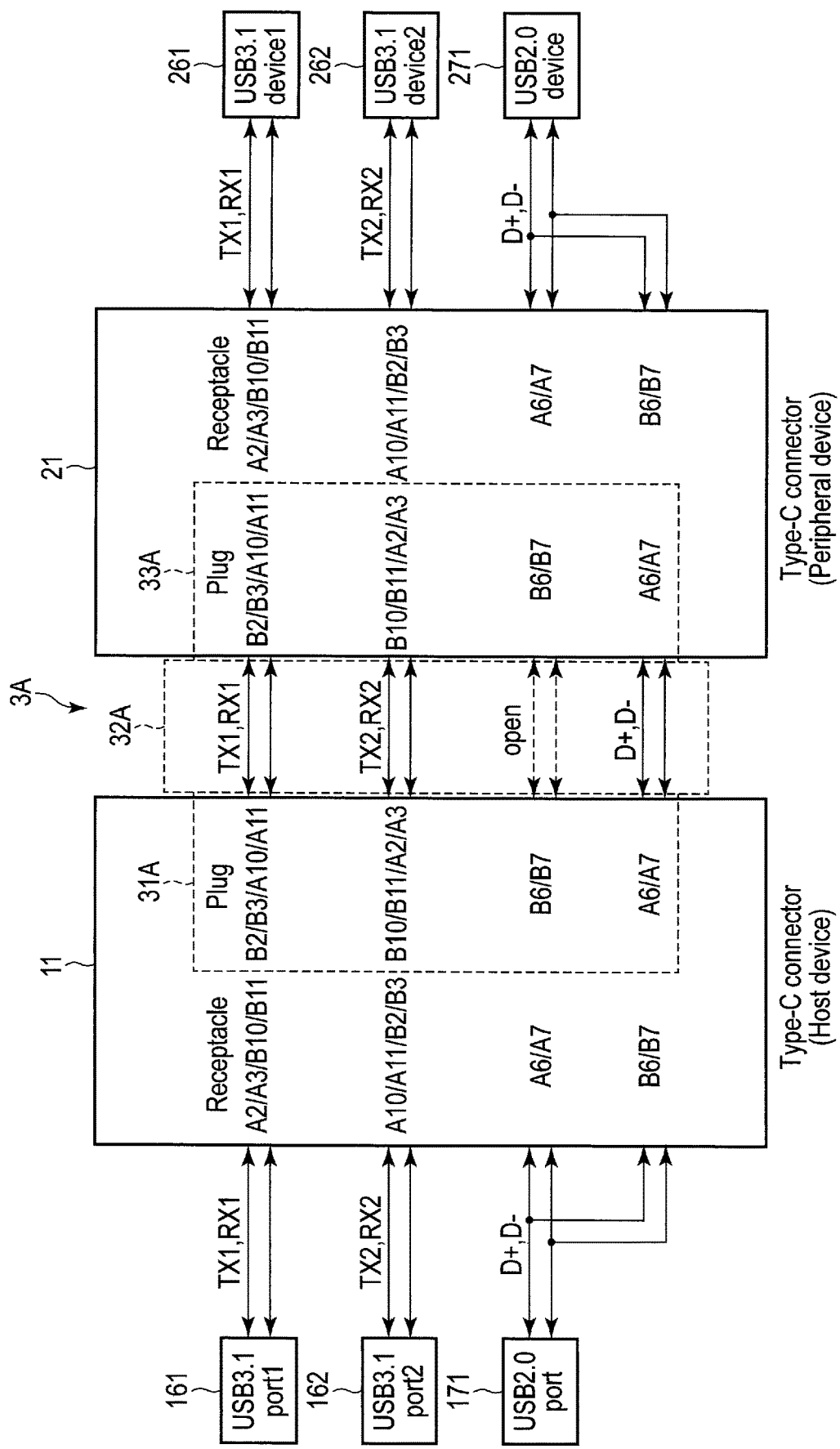
F I G. 5

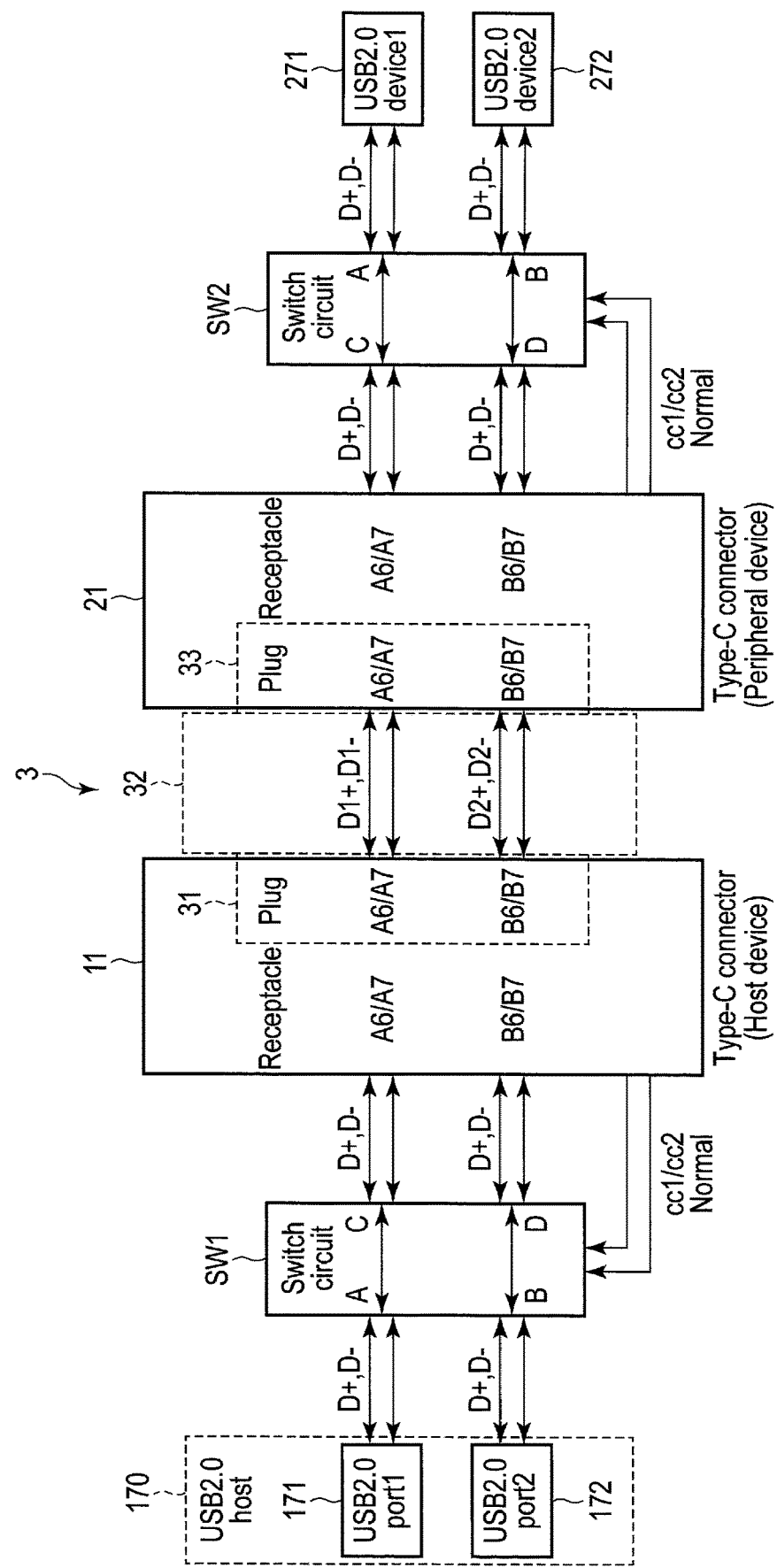
F I G. 8

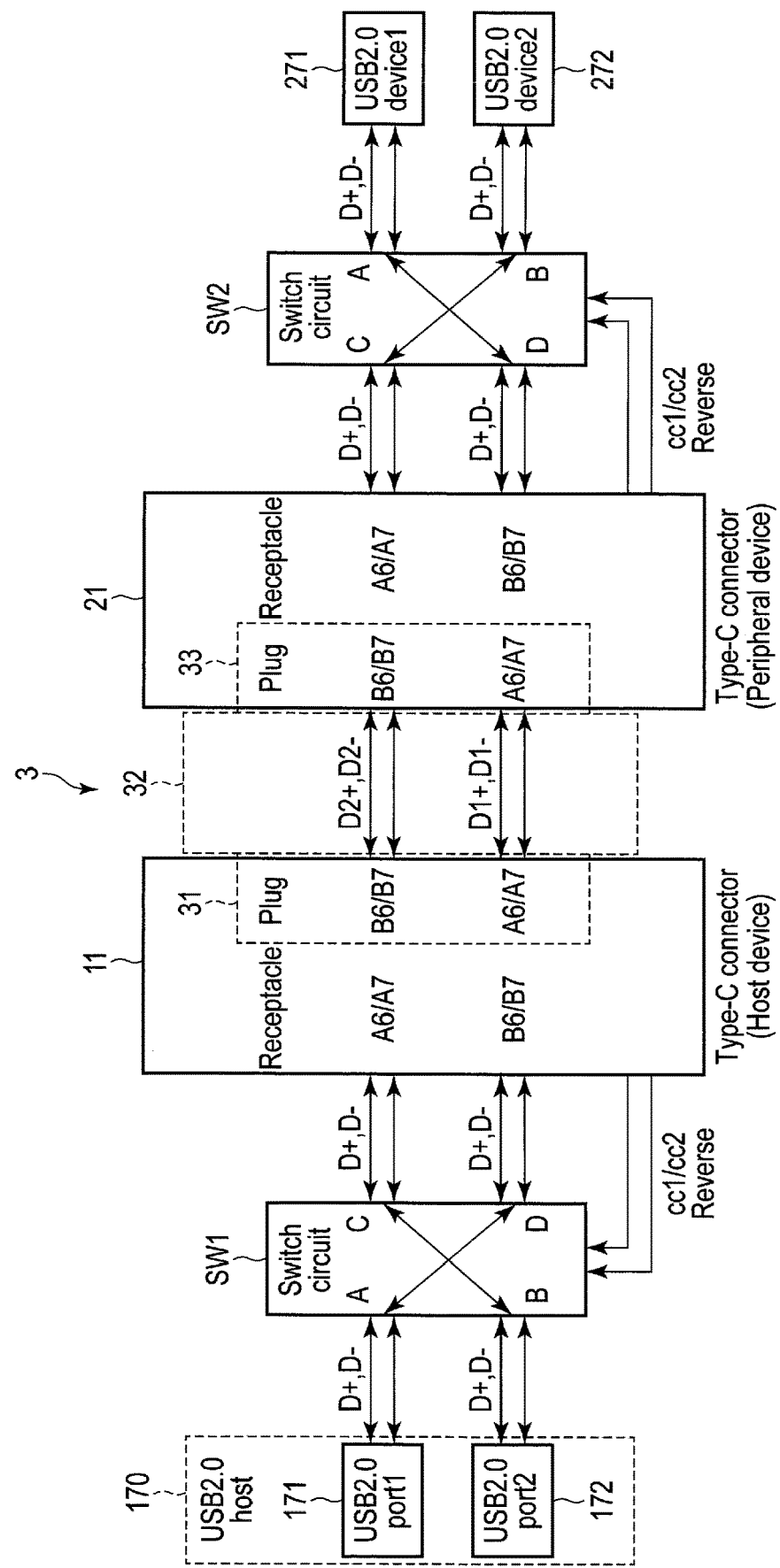
F I G. 9

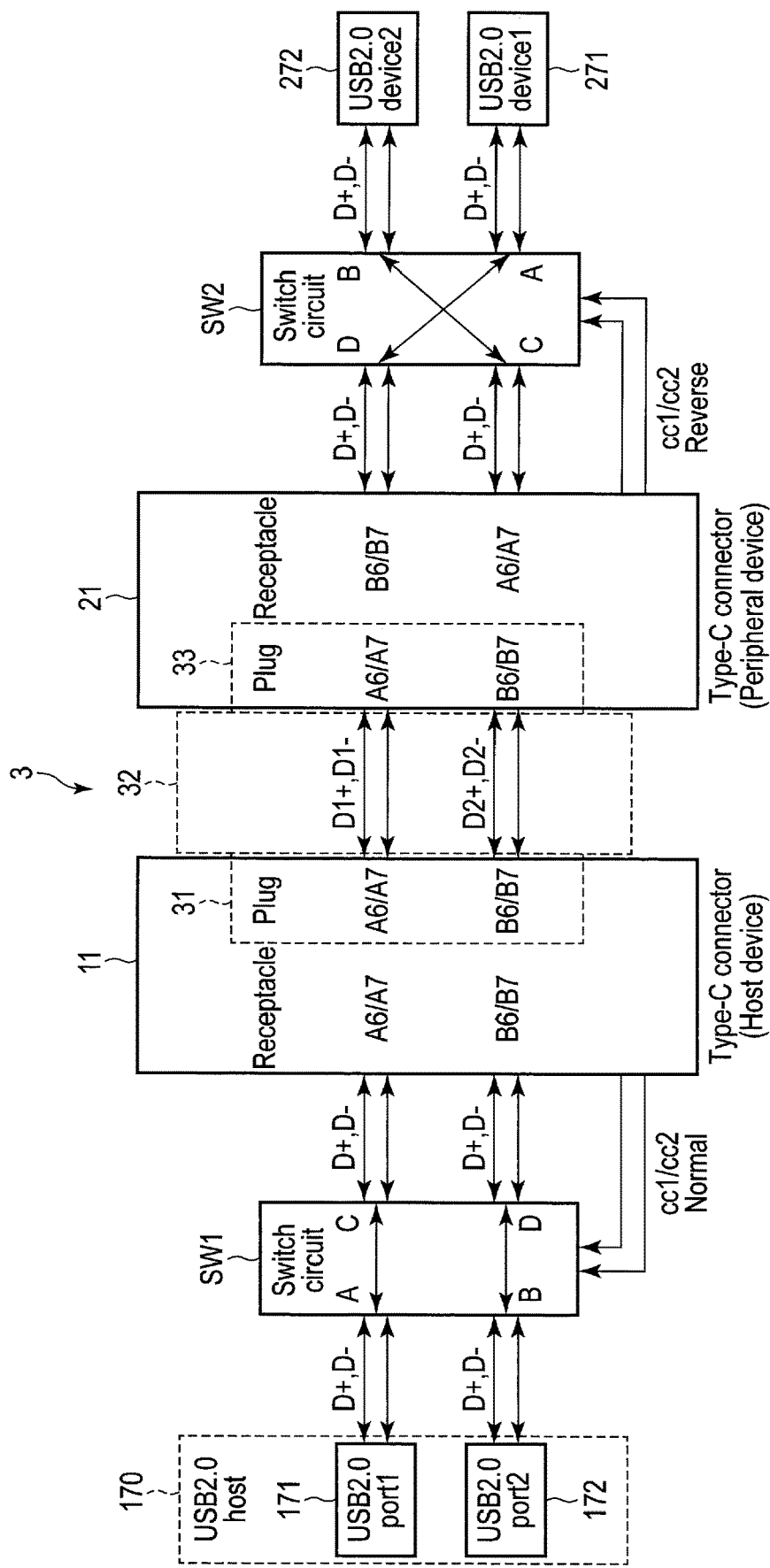
F I G. 10

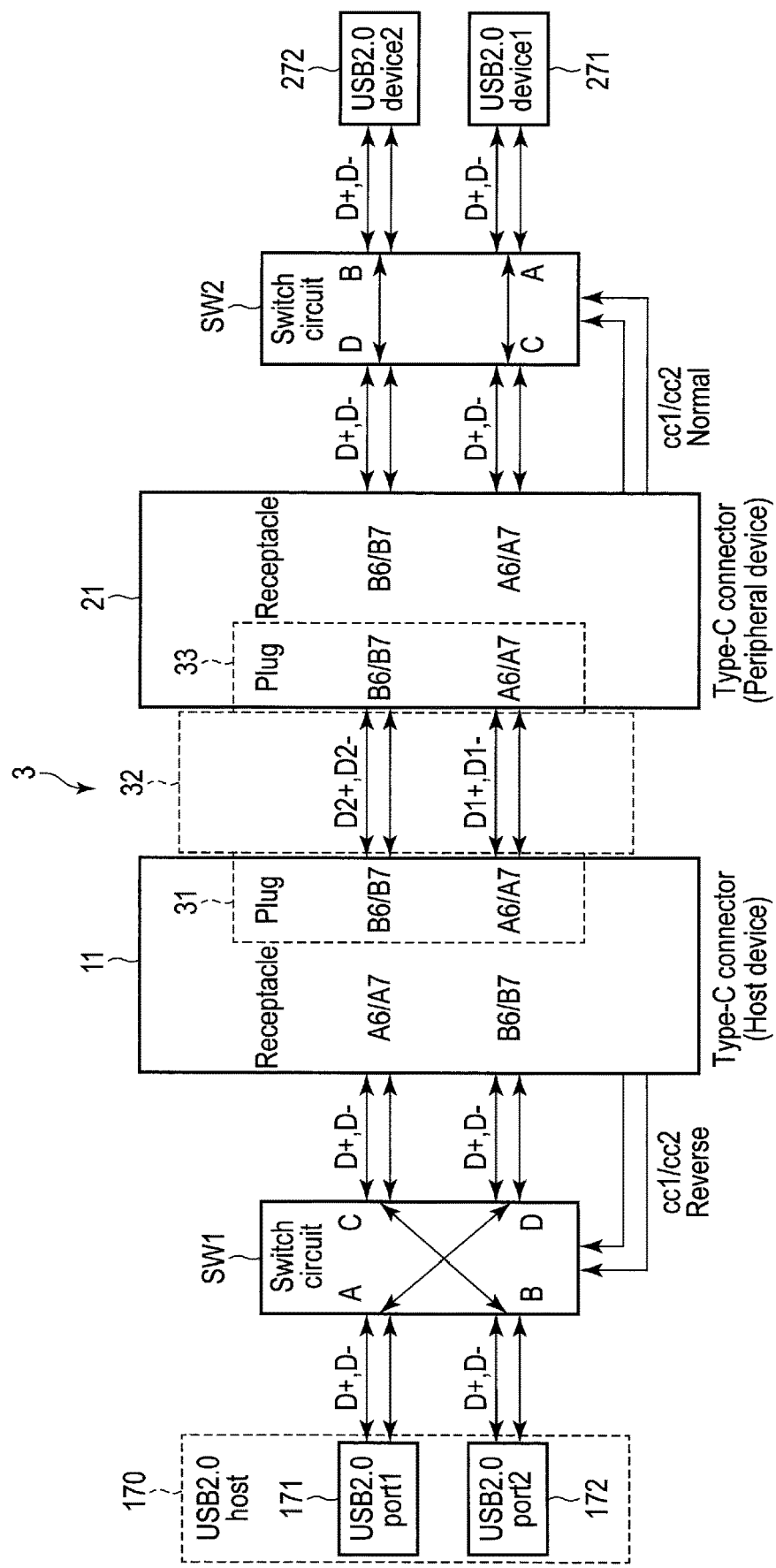
F I G. 11

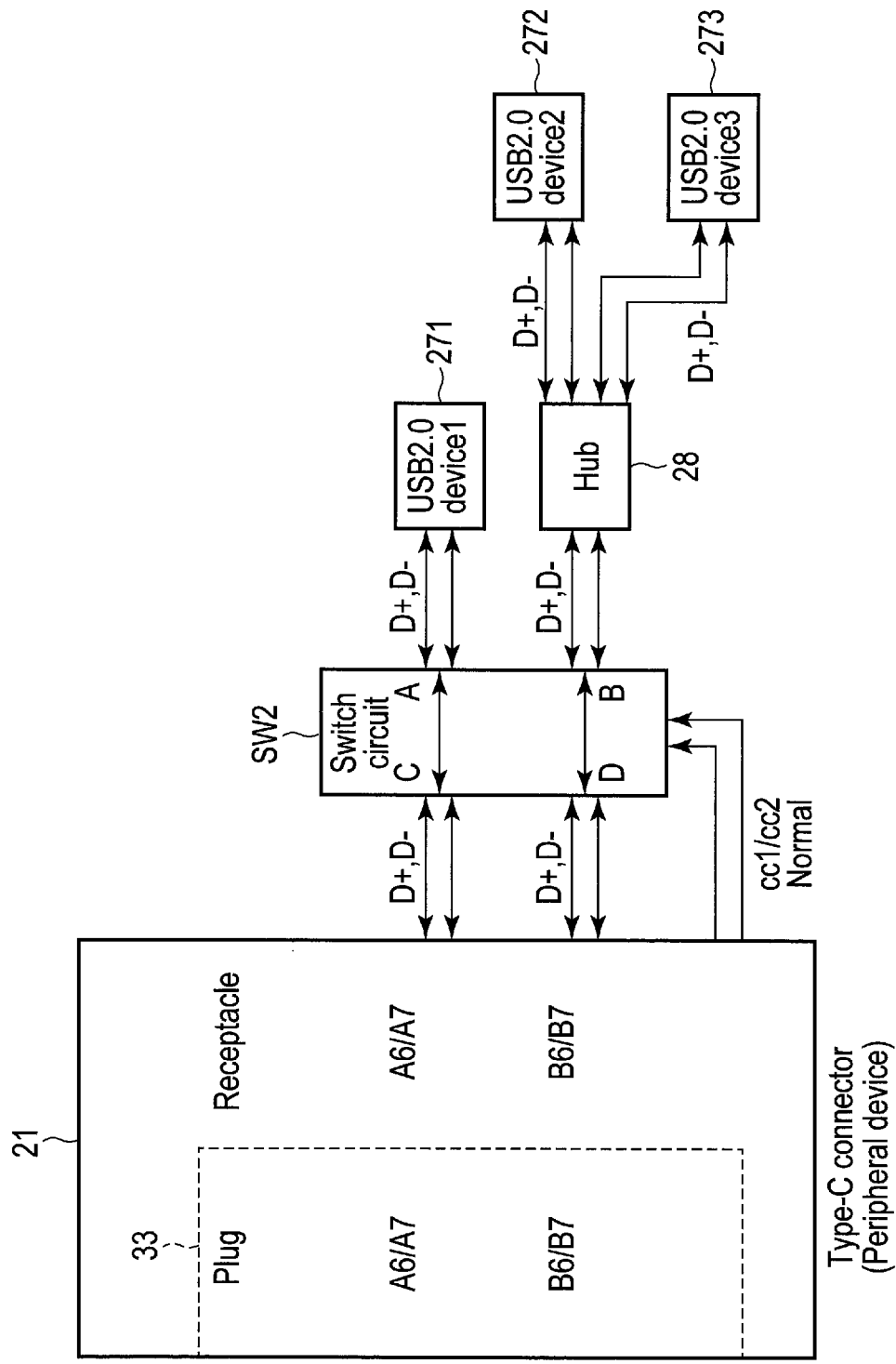
F I G. 12

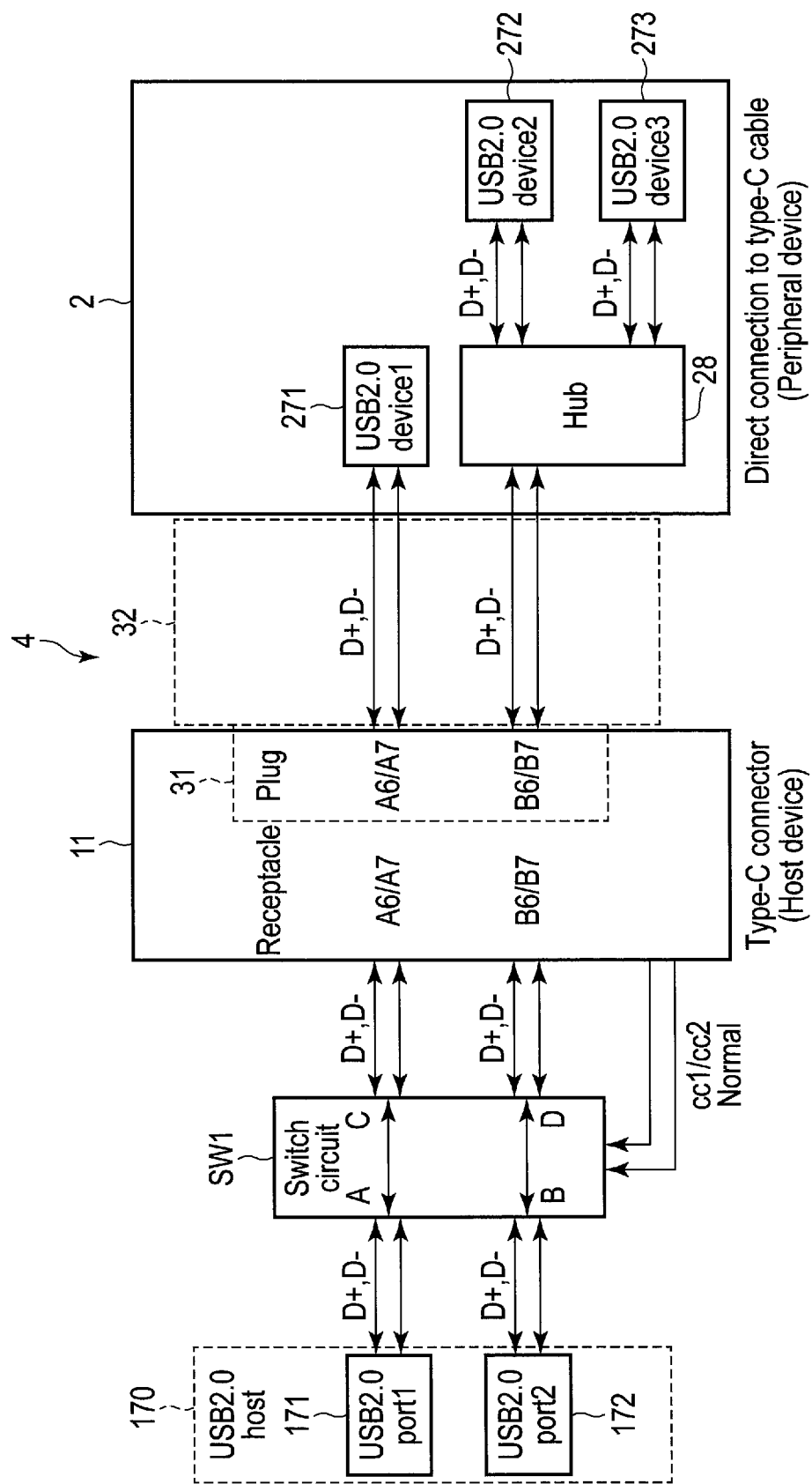
F I G. 15

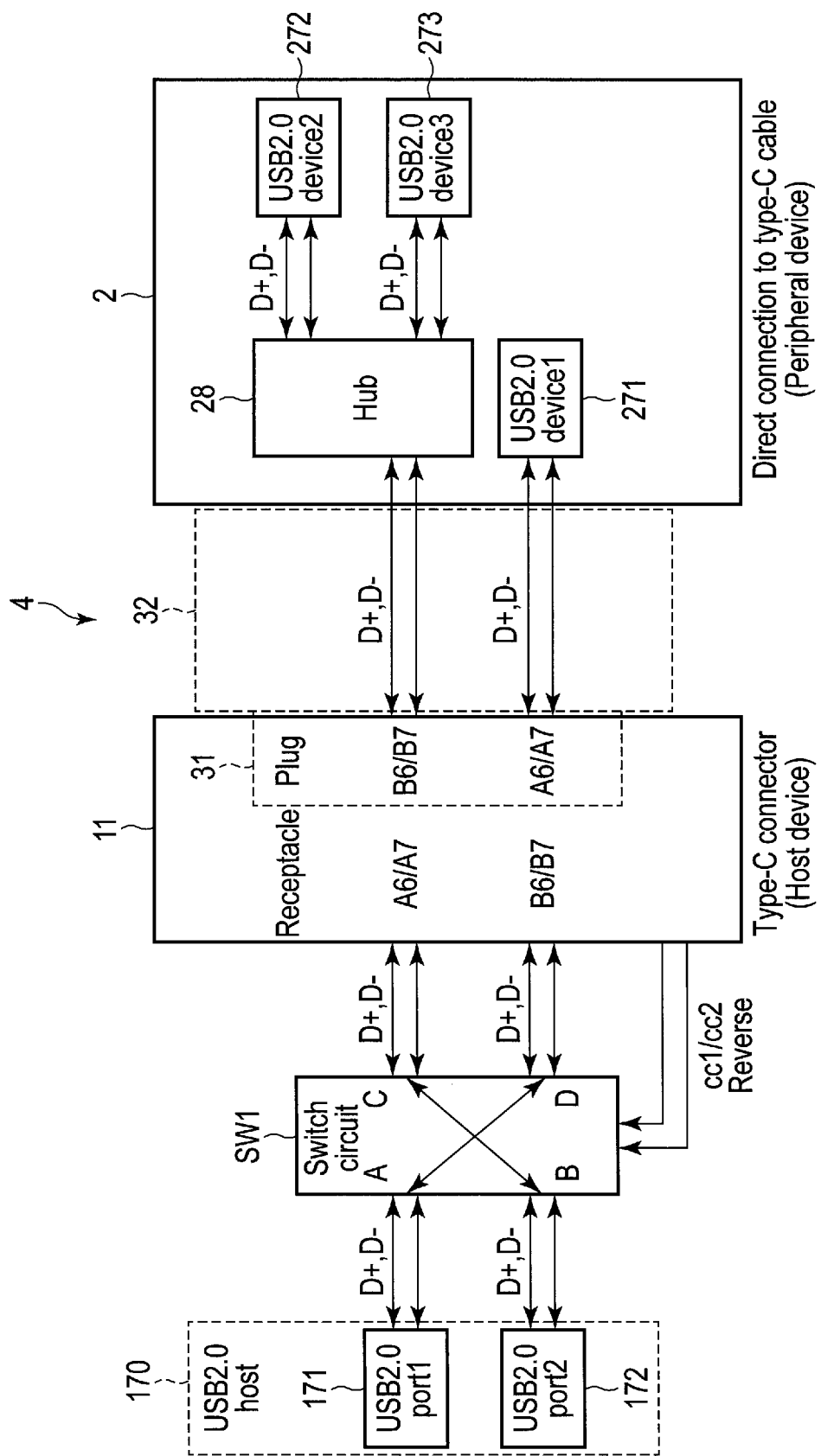
F I G. 16

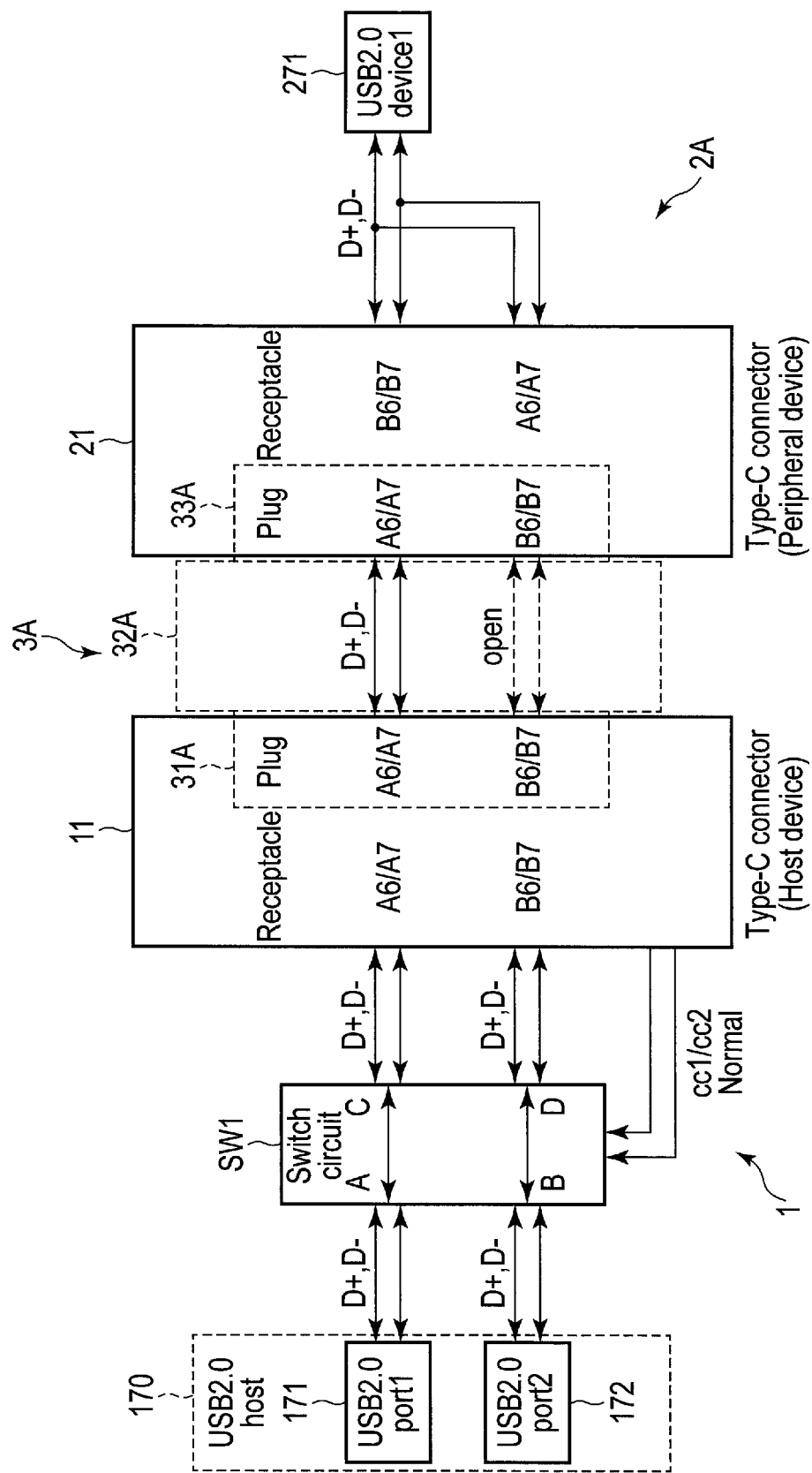
F I G. 19

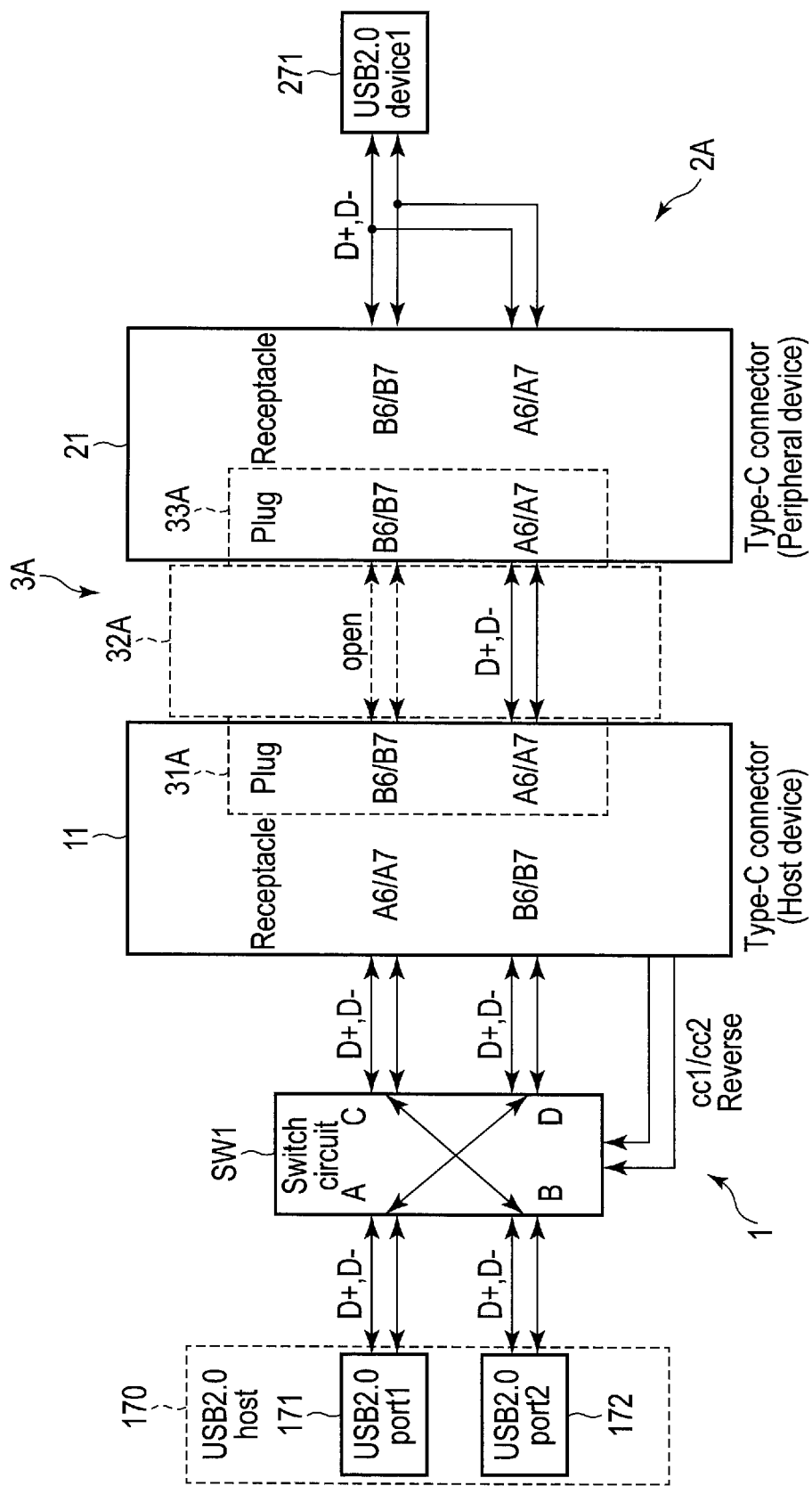
F I G. 20

ELECTRONIC DEVICE AND CONTROL SYSTEM

CROSS-REFERENCE TO RELATED APPLICATIONS

This application is based upon and claims the benefit of priority from Japanese Patent Application No. 2018-046917, filed Mar. 14, 2018, the entire contents of which are incorporated herein by reference.

FIELD

Embodiments described herein relate generally to an electronic device and a control system.

BACKGROUND

USB Type-C connectors include various functions such as USB, Display Port, Thunderbolt (registered trademark), and Power Delivery. Thus, when a Type-C connector is mounted on a small-size computer such as a mobile notebook-type PC or a tablet computer that cannot include many interface (I/F) ports, the Type-C connector can substitute for a Display Port connector, DC-IN connector, and the like.

In the connection between a host device and a peripheral device using a USB Type-C connector, two ports of Super Speed (SS) mode of USB 3.1 standard and one port of USB 2.0 standard are supported. That is, the host device provides two USB 3.1 ports and one USB 2.0 port to the peripheral device.

Here, when a peripheral device including two devices of USB 2.0 standard are connected to the host device, the host device only supports one USB 2.0 port, and thus, for example, a hub controller IC is provided with the peripheral device. By connecting the two USB 2.0 devices to the downstream ports of the hub controller IC of the peripheral device, the host device can control the two USB 2.0 devices via the hub controller IC.

The hub controller IC may have a power saving function that allows the hub controller IC to transit into a power saving state when the entire devices connected to the downstream ports do not operate. However, when the connected USB 2.0 devices operate with different frequency, the period during which the hub controller IC is maintained in the power saving state becomes short, and the effectiveness of the power saving becomes poor.

Thus, a new function to use multiple USB 2.0 port connections while saving the power is required.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 shows the structure of a control system according to a first embodiment.

FIG. 3 shows pin assignments of a plug of USB Type-C connector of a comparative example.

FIG. 5 is a block diagram of a second example of USB 3.1 port connection and USB 2.0 port connection of the USB Type-C connector of the comparative example.

FIG. 8 is a block diagram of an example of normal-normal connection of USB 2.0 port in the control system of the first embodiment.

FIG. 9 is a block diagram of an example of reverse-reverse connection of USB 2.0 port in the control system of the first embodiment.

FIG. 10 is a block diagram of an example of normal-reverse connection of USB 2.0 port in the control system of the first embodiment.

FIG. 11 is a block diagram of an example of reverse-normal connection of USB 2.0 port in the control system of the first embodiment.

FIG. 12 is a block diagram of an example where a hub controller IC is provided with a peripheral device in the control system of the first embodiment.

FIG. 15 is a block diagram of an example of normal-fix connection of USB 2.0 port in a control system of a second embodiment.

FIG. 16 is a block diagram of an example of reverse-fix connection of USB 2.0 port in a control system of the second embodiment.

FIG. 19 is a block diagram of an example of normal-reverse connection using the cable of USB Type-C standard in the control system of the third embodiment.

FIG. 20 is a block diagram of an example of reverse-normal connection using the cable of USB Type-C standard in the control system of the third embodiment.

DETAILED DESCRIPTION

Figure 2:
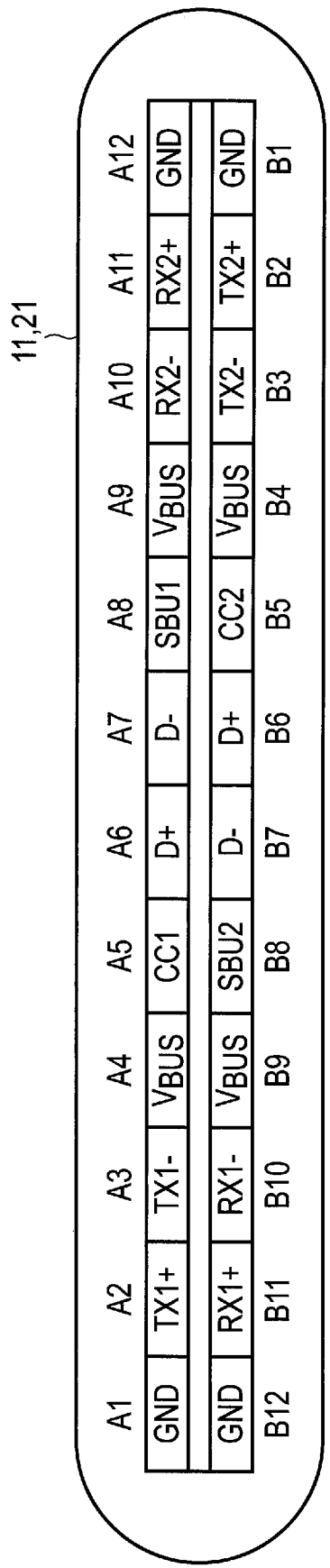
FIG. 2 shows pin assignments for a receptacle of USB Type-C connector used in the control system of the first embodiment.

Various embodiments will be described hereinafter with reference to the accompanying drawings.

In general, according to one embodiment, an electronic device includes a receptacle, a first port, a second port, and a switch circuit. The receptacle includes pins. A plug is insertable into the receptacle. The pins of the receptacle are connectable to pins of the plug respectively. The first port communicates with the receptacle by transmitting or receiving a first signal. The second port communicates with the receptacle by transmitting or receiving a second signal. The switch circuit switches a signal flow between the receptacle, and the first port and second port when the plug is inserted into the receptacle. The switch circuit communicates the first signal between the first port and one of a pair of first and second pins of the receptacle and a pair of third and fourth pins of the receptacle, and communicates the second signal between the second port and the other of the pair of the first and second pins of the receptacle and the pair of the third and fourth pins of the receptacle.

(First Embodiment)

The structure of a control system according to a first embodiment will be explained with reference to FIG. 1. The control system includes a host device 1 and a peripheral device 2 connected together via a cable 3. The host device 1 may realize as a computer or an incorporated system stored in various electronic devices. The peripheral device 2 is an electronic device connected to the host device 1 for use and may realize as various electronic devices, for example, a pointing device such as a mouse, a keyboard, a storage device, and an extension unit (docking station).

The host device 1 includes a receptacle interface 11 of Type-C standard (hereinafter may be referred to as receptacle). The peripheral device 2 also includes a receptacle interface 21 of USB Type-C standard. The receptacles 11 and 21 each include pins.

Furthermore, the cable 3 is obtained by partly modifying an USB Type-C standard cable. The cable 3 includes a cable body 32 and plug interfaces 31 and 33 (hereinafter may be referred to as plug) provided with both ends of the cable body 32. The plugs 31 and 33 each include pins, and have a shape that is capable of being inserted into or detached from the receptacles 11 and 21 of USB Type-C standard. In other words, the receptacles 11 and 21 each have a shape receivable the plugs 31 and 33.

When the plug 31 of the cable 3 is inserted into the receptacle 11 of the host device 1 and the plug 33 of the cable 3 is inserted into the receptacle 21 of the peripheral device 2, the host device 1 and the peripheral device 2 are connected. Signal transmission and power supply can be performed between the host device 1 and the peripheral device 2 through the cable 3.

FIG. 2 shows pin assignments of each receptacle 11 and 21 of Type-C standard. Each receptacle 11 and 21 includes 24 pins that consist of pins A1 to A12 and pins B1 to B12. Signals to be supplied are assigned to the pins A1 to A12 and pins B1 to B12, respectively. As shown in FIG. 2, signals are assigned to the pins of each receptacle 11 and 21 in a point-symmetric manner with respect to the center of each receptacle 11 and 21.

Specifically, differential pair signals D+ and D− for data bus conforming to USB 2.0 standard are assigned to the pins A6/A7, respectively. Differential pair signals D+ and D− for data bus conforming to USB 2.0 standard are assigned to the pins B6/B7, respectively. Differential pair signals D+ and D− are signals of USB 2.0 port.

Signals TX+, TX−, RX−, and RX+ for data bus conforming to USB 3.1 (or USB 3.0) standard are assigned to pins A2/A3/B10/B11 and pins B2/B3/A10/A11, respectively. VBUS for power supply is assigned to pins A4, A9, B4, and B9. Ground GND is assigned to pins A1, A12, B1, and B12. Configuration channels CC1 and CC2 are assigned to pins A5 and B5, respectively. Furthermore, sidebands SBU1 and SBU2 are assigned to pins A8 and B8, respectively.

In the present embodiment, the cable 3 that is obtained by partly modifying a cable of USB Type-C standard is used. Firstly, a comparative example in which a cable of Type-C standard (hereinafter may be referred to as USB Type-C cable) is used will be explained with reference to FIGS. 3 to 6.

FIG. 3 shows pin assignments of each plug 31A and 33A of a USB Type-C cable. The plugs 31A and 33A are provided with both ends of the USB Type-C cable. Each plug 31A and 33A includes 24 pins that consist of pins A1 to A12 and pins B1 to B12. Signals to be supplied are assigned to the pins A1 to A12 and pins B1 to B12, respectively. As shown in FIG. 3, signals are assigned to the pins of each plug 31A and 33A in a point-symmetric manner with respect to the center of each plug 31A and 33A except for pins A6/A7, B6/37, A5, and B5.

Specifically, differential pair signals D+ and D− for data bus conforming to USB 2.0 standard are assigned to the pins A6/A7, respectively. Signals TX+, TX−, RX−, and RX+ for data bus conforming to USB 3.1 (or USB 3.0) standard are assigned to pins A2/A3/B10/B11 and pins B2/B3/A10/A11, respectively. VBUS for power supply is assigned to pins A4, A9, 84, and B9. Ground GND is assigned to pins A1, A12, B1, and B12. Configuration channel CC is assigned to pin A5. Type-C cable plug power VCONN is assigned to pin B5. Furthermore, sidebands SBU1 and SBU2 are assigned to pins A8 and B8, respectively.

The USB Type-C cable body connecting the plugs 31A and 33A includes wires (cable lines). The wires consist of wires that connect pins A1 to A12 of the plug 31 and pins A1 to A12 of the plug 33, respectively, and wires that connect pins B1 to B5 and B8 to B12 of the plug 31A to pins B1 to B5 and B8 to B12 of the plug 33A, respectively.

Note that no signal is assigned to pins B6/B7. Furthermore, the cable body connecting the plugs 31A and 33A does not include a wire that connects pin B6 of the plug 31A and pin B6 of the plug 33A, and a wire that connects pin B7 of the plug 31A and pin B7 of the plug 33A.

Here, it is assumed a case where the receptacles 11 and 21 in the host device 1 and the peripheral device 2 are arranged such that pins A1 to A12 are positioned in the upper part and pins B1 to B12 are positioned in the lower part. Here, the side of pins A1 to A12 of each plug 31A and 33A will be referred to as front, and the side of pins B1 to B12 will be referred to as back.

With the pin arrangement of FIGS. 2 and 3, the host device 1 and the peripheral device 2 properly operate even if the front of each plug 31A and 33A is made upside and inserted into each receptacle 11 and 21 or even if the back of each plug 31A and 33A is made upside and inserted into each receptacle 11 and 21. That is, the host device 1 and the peripheral device 2 properly operate, regardless of the orientation of the plugs 31A and 33A inserted into the receptacles 11 and 21. Thus, with the pin assignments assigned in a point-symmetrical manner with respect to the center as described above, a user can insert the plugs 31A and 33A into the receptacles 11 and 21 without considering the orientation of the plugs 31A and 33A.

Figure 4:
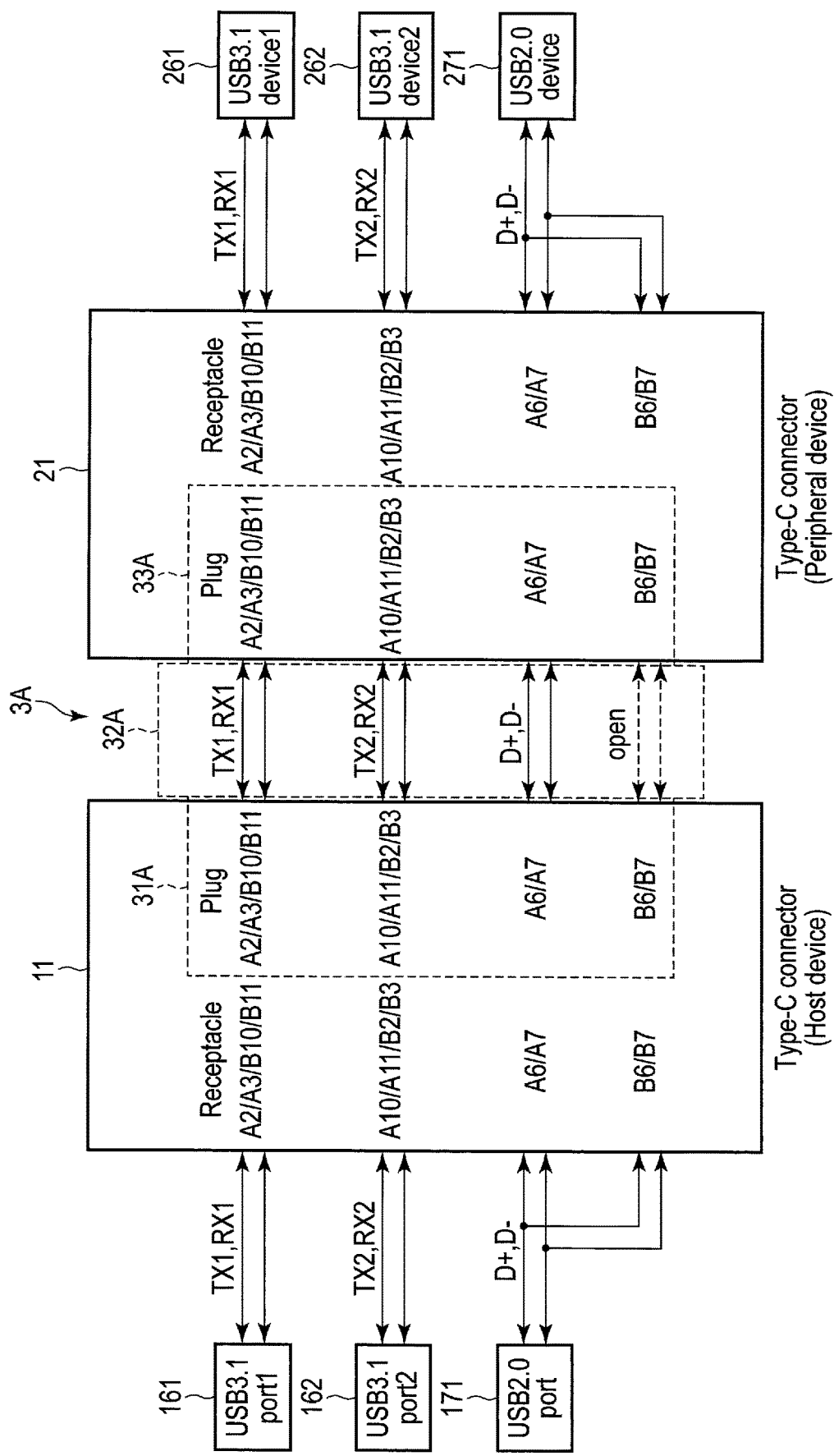
FIG. 4 is a block diagram of a first example of USB 3.1 port connection and USB 2.0 port connection of the USB Type-C connector of the comparative example.

FIGS. 4 and 5 show an example of USB 3.1 standard port connection and USB 2.0 standard port connection where the plugs 31A and 33A of the USB Type-C cable 3A are inserted into the receptacle 11 of the host device 1 and the receptacle 21 of the peripheral device 2, respectively. In a case where the host device 1 and the peripheral device 2 are connected via the USB Type-C cable 3A, two super speed (SS) ports of USB 3.1 standard and one port of USB 2.0 standard are supported.

The host device 1 includes two ports of USB 3.1 standard (USB 3.1 ports) 161 and 162, and one port of USB 2.0 standard (USB 2.0 port) 171. The peripheral device 2 includes two USB 3.1 devices 261 and 262, and one USB 2.0 device 271. Note that, in FIGS. 4 and 5, only the pins used for USB 3.1 port connection and USB 2.0 port connection are depicted for the sake of easy understanding.

With reference to FIG. 4, a case where pins A1 to A12 of each receptacle 11 and 21 and pins A1 to A12 of each plug 31A and 33A are connected, and pins B1 to B12 of each receptacle 11 and 21 and pins B1 to B12 of each plug 31A and 33A are connected, will be explained.

On the host device 1 side, pins A2/A3/B10/B11 of the receptacle 11 are connected to pins A2/A3/B10/B11 of the plug 31A, and on the peripheral device 2 side, pins A2/A3/B10/B11 of the receptacle 21 are connected to pins A2/A3/B10/B11 of the plug 33A. Thus, the host device 1 can control the USB 3.1 device 261 in the peripheral device 2 using the USB 3.1 port 161. The host device 1 can communicate with the USB 3.1 device 261 using the USB 3.1 port 161 by transmitting or receiving signals (TX1 and RX1).

Similarly, on the host device 1 side, pins A10/A11/B2/B3 of the receptacle 11 are connected to pins A10/A11/B2/B3 of the plug 31A, and on the peripheral device 2 side, pins A10/A11/B2/B3 of the receptacle 21 are connected to pins A10/A11/B2/B3 of the plug 33A. Thus, the host device 1 can control the USB 3.1 device 262 in the peripheral device 2 using the USB 3.1 port 162. The host device 1 can communicate with an USB 3.1 device 262 using the USB 3.1 port 162 by transmitting or receiving signals (TX2 and RX2).

Furthermore, on the host device 1 side, signals of pins A6 and B6 directly connected on a printed circuit board (PCB), and signals of pins A7 and B7 directly connected on the PCB, are used as signals for the USB 2.0 port 171. On the peripheral device 2 side, signals of pins A6 and B6 directly connected on a PCB, and signals of pins A7 and B7 directly connected on the PCB, are used as signals for the USB 2.0 device 271.

Specifically, on the host device 1 side, pins A6/A7 of the receptacle 11 are connected to pins A6/A7 of the plug 31A, and on the peripheral device 2 side, pins A6/A7 of the receptacle 21 are connected to pins A6/A7 of the plug 33A. Thus, the host device 1 can control the USB 2.0 device 271 in the peripheral device 2 using the USB 2.0 port 171. The host device 1 can communicate with the USB 2.0 device 271 by transmitting or receiving differential pair signals (D+ and D−).

Furthermore, on the host device 1 side, pins B6/B7 of the receptacle 11 are connected to pins B6/B7 of the plug 31A, and on the peripheral device 2 side, pins B6/B7 of the receptacle 21 are connected to pins B6/B7 of the plug 33A. As described above, pins B6/B7 of the plug 31A and pins B6/B7 of the plug 33A are disconnected (are open), and there is no wire connecting them. Thus, the signal transmitted from the USB 2.0 port 171 to pins B6/B7 of the receptacle 11 does not reach the USB 2.0 device 271, and the signal transmitted from the USB 2.0 device 271 to pins B6/B7 of the receptacle 21 does not reach the USB 2.0 port 171.

Now, with reference to FIG. 5, a case where pins A1 to A12 of each receptacle 11 and 21 and pins B1 to B12 of each plug 31A and 33A are connected, and pins B1 to B12 of each receptacle 11 and 21 and pins A1 to A12 of each plug 31A and 33A are connected, will be explained.

On the host device 1 side, pins A2/A3/B10/B11 of the receptacle 11 are connected to pins B2/B3/A10/A11 of the plug 31A, and on the peripheral device 2 side, pins A2/A3/B10/B11 of the receptacle 21 are connected to pins B2/B3/A10/A11 of the plug 33A.

Thus, the host device 1 can control the USB 3.1 device 261 in the peripheral device 2 using the USB 3.1 port 161. The host device 1 can communicate with the USB 3.1 device 261 using the USB 3.1 port 161 by transmitting or receiving signals (TX1 and RX1).

Similarly, on the host device 1 side, pins A10/A11/B2/B3 of the receptacle 11 are connected to pins B10/B11/A2/A3 of the plug 31A, and on the peripheral device 2 side, pins A10/A11/B2/B3 of the receptacle 21 are connected to pins B10/B11/A2/A3 of the plug 33A. Thus, the host device 1 can control the USB 3.1 device 262 in the peripheral device 2 using the USB 3.1 port 162. The host device 1 can communicate with the USB 3.1 device 262 using the USB 3.1 port 162 by transmitting or receiving signals (TX2 and RX2).

Furthermore, on the host device 1 side, signals of pins A6 and B6 directly connected on a printed circuit board (PCB), and signals of pins A7 and B7 directly connected on the PCB, are used as signals for the USB 2.0 port 171. On the peripheral device 2 side, signals of pins A6 and B6 directly connected on a PCB, and signals of pins A7 and B7 directly connected on the PCB, are used as signals for the USB 2.0 device 271.

Specifically, on the host device 1 side, pins B6/B7 of the receptacle 11 are connected to pins A6/A7 of the plug 31A, and on the peripheral device 2 side, pins B6/B7 of the receptacle 21 are connected to pins A6/A7 of the plug 33A. Thus, the host device 1 can control the USB 2.0 device 271 in the peripheral device 2 using the USB 2.0 port 171. The host device 1 can communicate with the USB 2.0 device 271 by transmitting or receiving differential pair signals (D+ and D−).

Furthermore, on the host device 1 side, pins A6/A7 of the receptacle 11 are connected to pins B6/B7 of the plug 31A, and on the peripheral device 2 side, pins A6/A7 of the receptacle 21 are connected to pins B6/B7 of the plug 33A. As described above, pins B6/B7 of the plug 31A and pins B6/B7 of the plug 33A are disconnected (are open), and there is no wire connecting them. Thus, the signal transmitted from the USB 2.0 port 171 to pins A6/A7 of the receptacle 11 does not reach the USB 2.0 device 271, and the signal transmitted from the USB 2.0 device 271 to pins A6/A7 of the receptacle 21 does not reach the USB 2.0 port 171.

With the above structure, the host device 1 and the peripheral device 2 connected by the USB Type-C cable 3A establish the two USB 3.1 port connections and the one USB 2.0 port connection, regardless of the orientation (front/back) of the plugs 31A and 33A inserted into the receptacles 11 and 21.

Here, the peripheral device 2 may include multiple devices of USB 2.0 standard. In such a case, the peripheral device 2 needs to extend the number of ports by implementing a hub controller IC in the peripheral device 2. As described above, in a case where the host device 1 and the peripheral device 2 are connected by the USB Type-C cable 3A, two Super Speed (SS) ports of USB 3.1 standard are supported while only one port of USB 2.0 standard is supported. Thus, if the peripheral device 2 includes multiple USB 2.0 devices, the peripheral device 2 needs to include a hub controller IC. In the peripheral device 2, two USB 2.0 devices are connected to downstream ports of the hub controller IC, and the host device 1 can control the two USB 2.0 devices via the hub controller IC.

Figure 6:
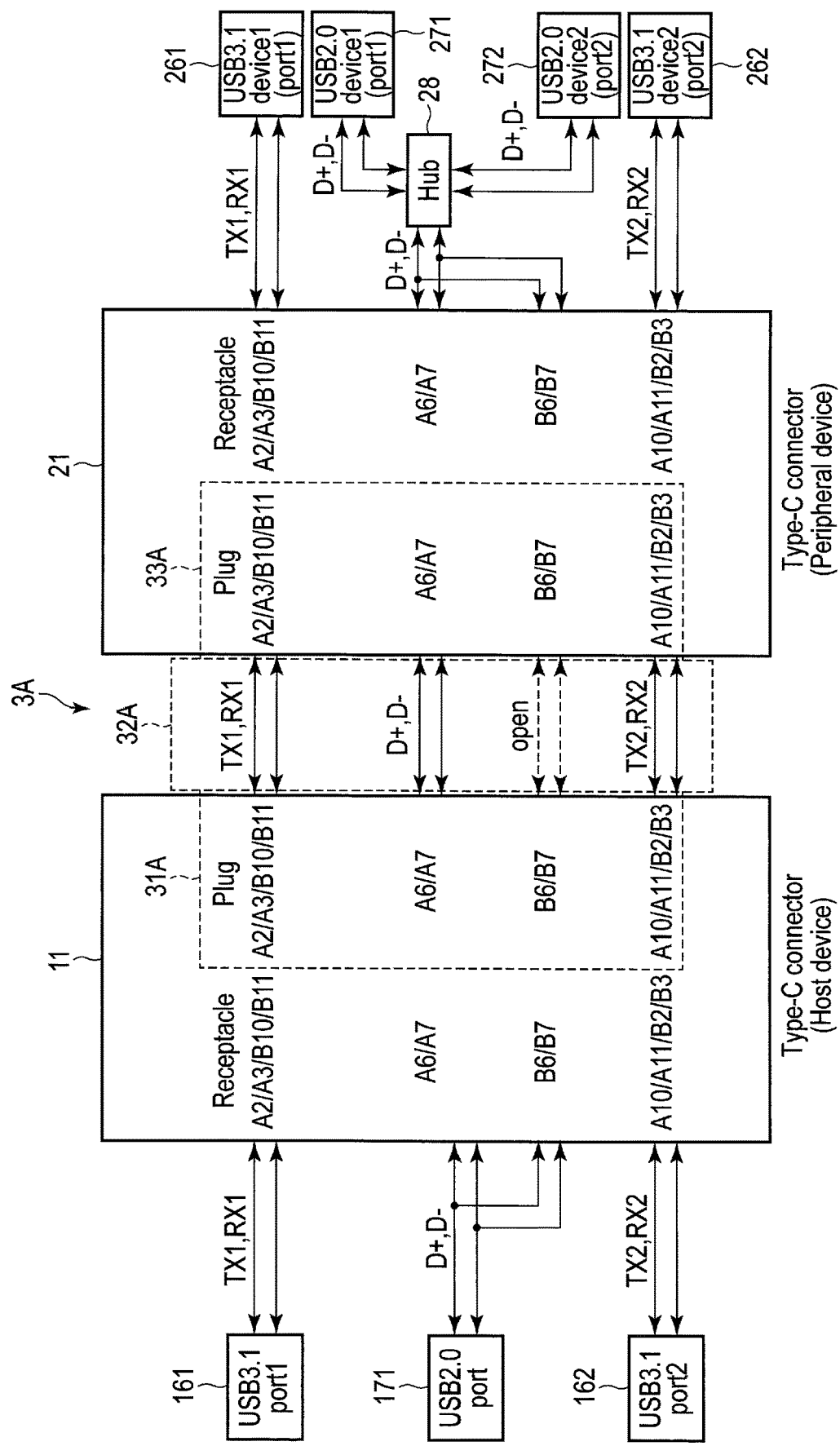
FIG. 6 is a block diagram of a third example of USB 3.1 port connection and USB 2.0 port connection of the USB Type-C connector of the comparative example.

FIG. 6 shows an example where the peripheral device 2 includes a hub controller IC (hereinafter may be referred to as hub) 28 in order to use two USB 2.0 devices 271 and 272 in the peripheral device 2. In the peripheral device 2, for example, signals (D+ and D−) received using pins A6/A7 of the receptacle 21 are transmitted to the USB 2.0 device 271 or the USB 2.0 device 272 via the hub 28. Signals (D+ and D−) transmitted from the USB 2.0 device 271 or 272 are transmitted to pins A6/A7 and pins B6/B7 of the receptacle 21 via the hub 28.

The peripheral device 2 may provide a pair of USB 3.1 port to which the USB 3.1 device 261 is connected and USB 2.0 port to which the USB 2.0 device 271 is connected as a standard port that supports both the USB 3.1 standard and USB 2.0 standard, and also provide a pair of USB 3.1 port to which the USB 3.1 device 262 is connected and USB 2.0 port to which the USB 2.0 device 272 is connected as the standard port. Thus, in order to provide two standard ports, the hub controller IC must be provided with the peripheral device 2.

The hub controller IC may have a power saving function that allows the hub controller IC to transit into a power saving state when the entire devices connected to the downstream ports do not operate. However, when the USB 2.0 devices operate with different frequency (operation intervals), the period during which the hub controller IC is maintained in the power saving state becomes short, and the power saving may not be effective.

The control system of the present embodiment is structured such that when the host device 1 and the peripheral device 2 are connected via a cable 3, multiple USB 2.0 ports can be used while reducing power. Thus, in the control system of the present embodiment, the connection between multiple USB 2.0 ports supported by the host device 1 and multiple USB 2.0 devices included in the peripheral device 2 can be established. Hereinafter, the control system of the first embodiment will be explained with reference to FIGS. 7 to 14.

Figure 7:
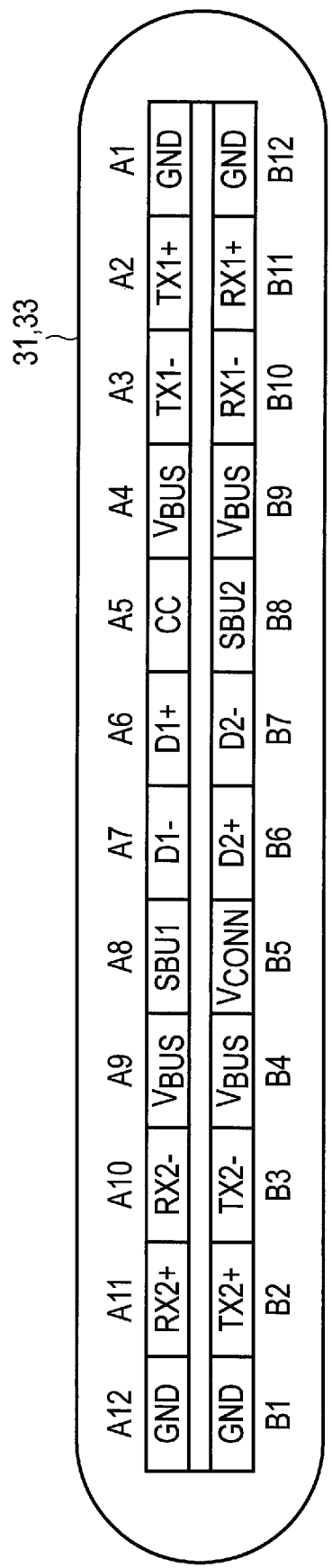
FIG. 7 shows pin assignments of a plug of an USB Type-C connector used in the control system of the first embodiment.

FIG. 7 shows pin assignments of each plug 31 and 33 provided with both ends of a cable 3 used in the control system. The cable 3 is obtained by partly modifying a cable of USB Type-C standard. Each plug 31 and 33 includes 24 pins that consist of pins A1 to A12 and pins B1 to B12. Signals to be supplied are assigned to the pins A1 to A12 and pins B1 to B12, respectively.

As with the plugs 31A and 33A of the USB Type-C cable described above with reference to FIG. 3, signals TX+, TX−, RX−, and RX+ for data bus conforming to USB 3.0 or USB 3.1 standard are assigned to pins A2/A3/B10/B11 and pins B2/B3/A10/A11, respectively. VBUS for power supply is assigned to pins A4, A9, B4, and B9. Ground GND is assigned to pins A1, A12, B1, and B12. Configuration channel CC is assigned to pin A5. Type-C cable plug power VCONN is assigned to pin B5. Sidebands SBU1 and SBU2 are assigned to pins A8 and B8, respectively.

Note that, as shown in FIG. 7, differential pair signals D1+ and D1− for data bus conforming to USB 2.0 standard are assigned to pins A6/A7. Differential pair signals D2+ and D2− for data bus conforming to USB 2.0 standard are assigned to pins B6/B7. That is, differential pair signals D2+ and D2− are assigned to the pins B6/B7 in the plugs 31 and 33, while no signal is assigned to the pins B6/B7 in the plugs 31A and 33A conforming to the USB Type-C standard. Thus, as shown in FIG. 7, signals are assigned to the pins of the plugs 31 and 33 in a point-symmetrical manner with respect to the center of the plugs 31 and 33 except for pins A5 and B5.

Furthermore, in the cable body 32 connecting the plugs 31 and 33, pins A1 to A12 of the plug 31 and pins A1 to A12 of the plug 33 are wired, respectively, and pins B1 to B12 of the plug 31 and pins B1 to B12 of the plug 33 are wired, respectively.

As can be understood from the above, in the plugs 31 and 33 of the cable 3, differential pair signals D2+ and D2− are assigned to pins B6/B7 to which no signal is assigned in the example of the plugs 31A and 33A conforming to the USB Type-C standard. Furthermore, in the cable body 32 connecting the plugs 31 and 33, pin B6 of the plug 31 and pin B6 of the plug 33 are wired, and pin B7 of the plug 31 and pin B7 of the plug 33 are wired.

Note that the pin assignments of the receptacle 11 included in the host device 1 and the pin assignments of the receptacle 21 included in the peripheral device 2 are as explained above with reference to FIG. 2.

Here, it is assumed a case where the receptacle 11 in the host device 1 and the receptacle 21 in the peripheral device 2 are arranged such that pins A1 to A12 are positioned in the upper part and pins B1 to B12 are positioned in the lower part. Here, the side of pins A1 to A12 of each plug 31 and 33 will be referred to as front, and the side of pins B1 to B12 will be referred to as back.

As in the case where the plugs 31A and 33A conforming to the USB Type-C standard are used, with the pin assignments shown in FIGS. 2 and 7, the host device 1 and the peripheral device 2 properly operate even if the front of each plug 31 and 33 is made upside and inserted into each receptacle 11 and 21 or even if the back of each plug 31 and 33 is made upside and inserted into each receptacle 11 and 21. That is, the host device 1 and the peripheral device 2 properly operate, regardless of the orientation of the plugs 31 and 33 inserted into the receptacles 11 and 21. Thus, with the pin assignments positioned in a point-symmetrical manner with respect to the center as described above, a user can insert the plugs 31 and 33 into the receptacles 11 and 21 without considering the orientation of the plugs 31 and 33.

FIGS. 8 to 11 show an example of USB 3.1 standard port connections and USB 2.0 standard port connections where the plugs 31 and 33 of the cable 3 are inserted into the receptacle 11 of the host device 1 and the receptacle 21 of the peripheral device 2, respectively. When the host device 1 and the peripheral device 2 are connected via the cable 3, two ports of USB 2.0 standard are supported, and two ports of USB 3.1 standard are supported as in the comparative example explained with reference to FIGS. 4 to 6. Note that the structure of the USB 3.1 ports is similar to the comparative example as described above with reference to FIGS. 4 to 6, and thus, detailed description thereof will be omitted in the following description.

The host device 1 includes two ports of USB 2.0 standard (USB 2.0 ports) 171 and 172. The peripheral device 2 includes two USB 2.0 devices 271 and 272. Note that, in FIGS. 8 to 11, only the pins used for the USB 2.0 port connections are depicted.

With reference to FIG. 8, a case where pins A1 to A12 of the plug 31, 33 are connected to pins A1 to A12 of the receptacle 11, 21, respectively, and pins B1 to B12 of the plug 31, 33 are connected to pins B1 to B12 of the receptacle 11, 21, respectively, will be explained.

Note that a case where pins A1 to A12 of the plug 31, 33 are connected to pins A1 to A12 of the receptacle 11, 21, respectively, and pins B1 to B12 of the plug 31, 33 are connected to pins B1 to B12 of the receptacle 11, 21, respectively, may be referred to as normal connection. On the other hand, a case where pins B1 to B12 of the plug 31, 33 are connected to pins A1 to A12 of the receptacle 11, 21, respectively, and pins A1 to A12 of the plugs 31 and 33 are connected to pins B1 to B12 of the receptacles 11, 21, respectively, may be referred to as reverse connection.

Thus, in the example of FIG. 8, the receptacle 11 and plug 31 are connected in the normal connection in the Type-C connector on the host device 1 side, and the receptacle 21 and the plug 33 are connected in the normal connection in the Type-C connector on the peripheral device 2 side.

On the host device 1 side, pins A6/A7 of the receptacle 11 are connected to pins A6/A7 of the plug 31, and pins B6/B7 of the receptacle 11 are connected to pins B6/B7 of the plug 31.

An USB 2.0 host 170 is a host controller of USB 2.0 in the host device 1. The USB 2.0 host 170 may be provided as an independent controller or may be provided with a greater circuit such as a System-on-a-Chip (SoC). The USB 2.0 host 170 includes two USB 2.0 ports 171 and 172. The USB 2.0 ports 171 and 172 communicate with the receptacle 11 via the switch circuit SW1 by transmitting or receiving a signal.

Signals D+ and D−, signals D1+ and D1−, signals D2+ and D2− are differential pair signals of USB 2.0. Switch circuits SW1 and SW2 controls switching of the differential pair signals of USB 2.0. The switch circuit SW1 controls such that, when the plug 31 is inserted into the receptacle 11, signals are communicated between one of pins A6/A7 (a pair of pins A6 and A7) and pins B6/B7 (a pair of pins B6 and B7) of the receptacle 11 and USB 2.0 port 171, and signals are communicated between the other of pins A6/A7 and pins B6/B7 of the receptacle 11 and USB 2.0 port 172.

Between pins A6/A7 and pins B6/B7 of the receptacle 11 and two USB 2.0 ports 171 and 172, USB 2.0 signals (D+ and D−) are communicated via two routes, respectively. That is, USB 2.0 signals are communicated via a certain route between pins A6/A7 of the receptacle 11 and one USB 2.0 port (one of 171 and 172). On the other hand, USB 2.0 signals are communicated via a different route between pins B6/B7 of the receptacle 11 and the other USB 2.0 port (the other of 171 and 172). Thus, the switch circuit SW1 is switched such that USB 2.0 signals can properly be communicated via two routes between pins A6/A7 and pins B6/B7 of the receptacle 11 and USB 2.0 ports 171 and 172.

Specifically, the switch circuit SW1 switches a signal flow of two USB 2.0 port connections, that is, the switch circuit SW1 connects pins A6/A7 and pins B6/B7 of the receptacle 11 with USB 2.0 port 171 and USB 2.0 port 172 according to whether the receptacle 11 and the plug 31 are connected in the normal connection or in the reverse connection. The switch circuit SW1 determines whether the receptacle 11 and the plug 31 are connected in the normal connection or in the reverse connection based on a voltage level of signals cc1/cc2 using at least one of signal cc1 transmitted from pin A5 (not shown in FIG. 8) of the receptacle 11 or signal cc2 transmitted from pin B5 (not shown in FIG. 8) of the receptacle 11.

The switch circuit SW1 includes four terminals A, B, C, and D. Terminal A of switch circuit SW1 is connected to terminal C or D by switching. Terminal B of switch circuit SW1 is connected to terminal C or D by switching. When terminal A is connected to terminal C, terminal B is connected to terminal D. On the other hand, when terminal A is connected to terminal D, terminal B is connected to terminal C.

According to whether the receptacle 11 and the plug 31 are connected in the normal connection or in the reverse connection, the switch circuit SW1 controls switching of the connections between the terminals.

(Case 1) The receptacle 11 and the plug 31 are connected in the normal connection.

The switch circuit SW1 is switched such that terminal A is connected to terminal C and terminal B is connected to terminal D. That is, the switch circuit SW1 is switched such that the signals are communicated between pins A6/A7 of the receptacle 11 and USB 2.0 port 171 and the signals are communicated between pins B6/B7 of the receptacle 11 and USB 2.0 port 172.

(Case 2) The receptacle 11 and the plug 31 are connected in the reverse connection.

The switch circuit SW1 is switched such that terminal A is connected to terminal D and terminal B is connected to terminal C. That is, the switch circuit SW1 is switched such that the signals are communicated between pins A6/A7 of the receptacle 11 and USB 2.0 port 172 and the signals are communicated between pins B6/B7 of the receptacle 11 and USB 2.0 port 171.

In the example of FIG. 8, the switch circuit SW1 detects that the receptacle 11 and the plug 31 are connected in the normal connection based on the signals cc1/cc2 transmitted from pins A5/B5 of the receptacle 11. Because of the normal connection, the switch circuit SW1 is switched such that terminal A is connected to terminal C and terminal B is connected to terminal D. Thus, the signals are communicated between pins A6/A7 of the receptacle 11 and USB 2.0 port 171, and the signals are communicated between pins B6/B7 of the receptacle 11 and USB 2.0 port 172.

In addition, on the peripheral device 2 side, pins A6/A7 of the receptacle 21 are connected to pins A6/A7 of the plug 33, and pins B6/B7 of the receptacle 21 are connected to pins B6/B7 of the plug 33.

USB 2.0 devices 271 and 272 communicate the signals with the receptacle 21 via the switch circuit SW2. The switch circuit SW2 is switched such that, when the plug 33 is inserted into the receptacle 21, signals are communicated between one of pins A6/A7 (a pair of pins A6 and A7) and pins B6/B7 (a pair of pins B6 and B7) of the receptacle 21 and USB 2.0 device 271, and signals are communicated between the other of pins A6/A7 and pins B6/B7 of the receptacle 21 and USB 2.0 device 272.

Between pins A6/A7 and pins B6/B7 of the receptacle 21 and two USB 2.0 ports 271 and 272, USB 2.0 signals (D+ and D−) are communicated via two routes, respectively. That is, USB 2.0 signals are communicated between pins A6/A7 of the receptacle 21 and one USB 2.0 port (one of 271 and 272) via a certain route. On the other hand, USB 2.0 signals are communicated between pins B6/B7 of the receptacle 21 and the other USB 2.0 port (the other of 271 and 272) via a different route. Thus, the switch circuit SW2 is switched such that USB 2.0 signals can properly be communicated between pins A6/A7 and pins B6/B7 of the receptacle 21 and USB 2.0 device 271 and 272 via two routes.

Specifically, the switch circuit SW2 connects pins A6/A7 and pins B6/B7 of the receptacle 21 with USB 2.0 device 271 and USB 2.0 device 272 according to whether the receptacle 21 and the plug 33 are connected in the normal connection or in the reverse connection. The switch circuit SW2 determines whether the receptacle 21 and the plug 33 are connected in the normal connection or in the reverse connection based on a voltage level of signals cc1/cc2 using at least one of signal cc1 transmitted from pin A5 (not shown in FIG. 8) of the receptacle 21 or signal cc2 transmitted from pin B5 (not shown in FIG. 8) of the receptacle 21.

As with the switch circuit SW1, the switch circuit SW2 includes four terminals A, B, C, and D. Terminal A of switch circuit SW2 is connected to terminal C or D by switching. Terminal B of switch circuit SW2 is connected to terminal C or D by switching. When terminal A is connected to terminal C, terminal B is connected to terminal D. On the other hand, when terminal A is connected to terminal D, terminal B is connected to terminal C.

According to whether the receptacle 21 and the plug 33 are connected in the normal connection or in the reverse connection, the switch circuit SW2 switches a signal flow of the connection between the terminals.

(Case 3) The receptacle 21 and the plug 33 are connected in the normal connection.

The switch circuit SW2 is switched such that terminal A is connected to terminal C and terminal B is connected to terminal D. Thus, the signals are communicated between pins A6/A7 of the receptacle 21 and USB 2.0 device 271 and the signals are communicated between pins B6/B7 of the receptacle 21 and USB 2.0 device 272.

(Case 4) The receptacle 21 and the plug 33 are connected in the reverse connection.

The switch circuit SW2 is switched such that terminal A is connected to terminal D and terminal B is connected to terminal C. Thus, the signals are communicated between pins A6/A7 of the receptacle 21 and USB 2.0 device 272 and the signals are communicated between pins B6/B7 of the receptacle 21 and USB 2.0 device 271.

In the example of FIG. 8, the switch circuit SW2 detects that the receptacle 21 and the plug 33 are connected in the normal connection based on the signals cc1/cc2 transmitted from pins A5/B5 of the receptacle 21. Because of the normal connection, the switch circuit SW2 is switched such that terminal A is connected to terminal C and terminal B is connected to terminal D. Thus, the signals are communicated between pins A6/A7 of the receptacle 21 and USB 2.0 device 271, and the signals are communicated between pins B6/B7 of the receptacle 21 and USB 2.0 device 272.

FIG. 9 shows an example where the receptacle 11 and the plug 31 are connected in the reverse connection in the Type-C connector on the host device 1 side, and the receptacle 21 and the plug 33 are connected in the reverse connection in the Type-C connector on the peripheral device 2 side.

On the host device 1 side, pins A6/A7 of the receptacle 11 are connected to pins B6/B7 of the plug 31 and pins B6/B7 of the receptacle 11 are connected to pins A6/A7 of the plug 31. The switch circuit SW1 detects that the receptacle 11 and the plug 31 are connected in the reverse connection based on the signals cc1/cc2 transmitted from pins A5/B5 (not shown in FIG. 9) of the receptacle 11. Because of the reverse connection, the switch circuit SW1 is switched such that terminal A is connected to terminal D and terminal B is connected to terminal C. Thus, the signals are communicated between pins A6/A7 of the receptacle 11 and USB 2.0 port 172, and the signals are communicated between pins B6/B7 of the receptacle 11 and USB 2.0 port 171.

In addition, on the peripheral device 2 side, pins A6/A7 of the receptacle 21 are connected to pins B6/B7 of the plug 33, and pins B6/B7 of the receptacle 21 are connected to pins A6/A7 of the plug 33. The switch circuit SW2 detects that the receptacle 21 and the plug 33 are connected in the reverse connection based on the signals cc1/cc2 transmitted from pins A5/B5 (not shown in FIG. 9) of the receptacle 21. Because of the reverse connection, the switch circuit SW2 is switched such that terminal A is connected to terminal D and terminal B is connected to terminal C. Thus, the signals are communicated between pins A6/A7 of the receptacle 21 and USB 2.0 device 272, and the signals are communicated between pins B6/B7 of the receptacle 21 and USB 2.0 device 271.

FIG. 10 shows an example where the receptacle 11 and the plug 31 are connected in the normal connection in the Type-C connector on the host device 1 side, and the receptacle 21 and the plug 33 are connected in the reverse connection in the Type-C connector on the peripheral device 2 side.

On the host device 1 side, pins A6/A7 of the receptacle 11 are connected to pins A6/A7 of the plug 31 and pins B6/B7 of the receptacle 11 are connected to pins B6/B7 of the plug 31. The switch circuit SW1 detects that the receptacle 11 and the plug 31 are connected in the normal connection based on the signals cc1/cc2 transmitted from pins A5/B5 (not shown in FIG. 10) of the receptacle 11. Because of the normal connection, the switch circuit SW1 is switched such that terminal A is connected to terminal C and terminal B is connected to terminal D. Thus, the signals are communicated between pins A6/A7 of the receptacle 11 and USB 2.0 port 171, and the signals are communicated between pins B6/B7 of the receptacle 11 and USB 2.0 port 172.

In addition, on the peripheral device 2 side, pins A6/A7 of the receptacle 21 are connected to pins B6/B7 of the plug 33, and pins B6/B7 of the receptacle 21 are connected to pins A6/A7 of the plug 33. The switch circuit SW2 detects that the receptacle 21 and the plug 33 are connected in the reverse connection based on the signals cc1/cc2 transmitted from pins A5/B5 (not shown in FIG. 10) of the receptacle 21. Because of the reverse connection, the switch circuit SW2 is switched such that terminal A is connected to terminal D and terminal B is connected to terminal C. Thus, the signals are communicated between pins A6/A7 of the receptacle 21 and USB 2.0 device 272, and the signals are communicated between pins B6/B7 of the receptacle 21 and USB 2.0 device 271.

FIG. 11 shows an example where the receptacle 11 and the plug 31 are connected in the reverse connection in the Type-C connector on the host device 1 side, and the receptacle 21 and the plug 33 are connected in the normal connection in the Type-C connector on the peripheral device 2 side.

On the host device 1 side, pins A6/A7 of the receptacle 11 are connected to pins B6/B7 of the plug 31 and pins B6/B7 of the receptacle 11 are connected to pins A6/A7 of the plug 31. The switch circuit SW1 detects that the receptacle 11 and the plug 31 are connected in the reverse connection based on the signals cc1/cc2 transmitted from pins A5/B5 (not shown in FIG. 11) of the receptacle 11. Because of the reverse connection, the switch circuit SW1 is switched such that terminal A is connected to terminal D and terminal B is connected to terminal C. Thus, the signals are communicated between pins A6/A7 of the receptacle 11 and USB 2.0 port 172, and the signals are communicated between pins B6/B7 of the receptacle 11 and USB 2.0 port 171.

In addition, on the peripheral device 2 side, pins A6/A7 of the receptacle 21 are connected to pins A6/A7 of the plug 33, and pins B6/B7 of the receptacle 21 are connected to pins B6/B7 of the plug 33. The switch circuit SW2 detects that the receptacle 21 and the plug 33 are connected in the normal connection based on the signals cc1/cc2 transmitted from pins A5/B5 (not shown in FIG. 11) of the receptacle 21. Because of the normal connection, the switch circuit SW2 is switched such that terminal A is connected to terminal C and terminal B is connected to terminal D. Thus, the signals are communicated between pins A6/A7 of the receptacle 21 and USB 2.0 device 271, and the signals are communicated between pins B6/B7 of the receptacle 21 and USB 2.0 device 272.

With the above structure, two USB 2.0 port connections are available between the host device 1 and the peripheral device 2 using the USB Type-C connector without a hub controller IC provided with the peripheral device 2. Thus, as compared to a case where a host device only supports one USB 2.0 port and two USB 2.0 ports are operated by using a hub controller IC in a peripheral device, the present embodiment can reduce power that is required to operate the hub controller IC.

FIG. 12 shows an example where a hub controller IC (hub) 28 is provided with the peripheral device 2 of the present embodiment, and three USB 2.0 devices 271, 272, and 273 are operated. In this example, the plug 33 and the receptacle 21 are connected in the normal connection in the Type-C connector on the peripheral device 2 side. The switch circuit SW2 is switched such that the signals are communicated between pins A6/A7 of the receptacle 21 and USB 2.0 device 271, and the signals are communicated between pins B6/B7 of the receptacle 21 and hub 28. Two USB 2.0 devices 272 and 273 are connected to the hub 28. Furthermore, the hub 28 includes a power saving function by which the hub 28 transitions to a power saving state when the entire devices connected to the downstream ports of the hub 18 are not in operation.

In that case, in the peripheral device 2, USB 2.0 device 271 which is frequently used is connected to the USB 2.0 port connected to A6/A7 pins of the receptacle 21 via the switch circuit SW2, and two USB 2.0 devices 272 and 273 which are infrequently used are connected to the two USB 2.0 downstream ports of the hub 28, respectively, for example. Since the USB 2.0 devices 272 and 273 which are infrequently used are connected to the hub 28, a period of the power saving state of the hub 28 can be elongated, and a high power saving effect can be achieved.

Figure 13:
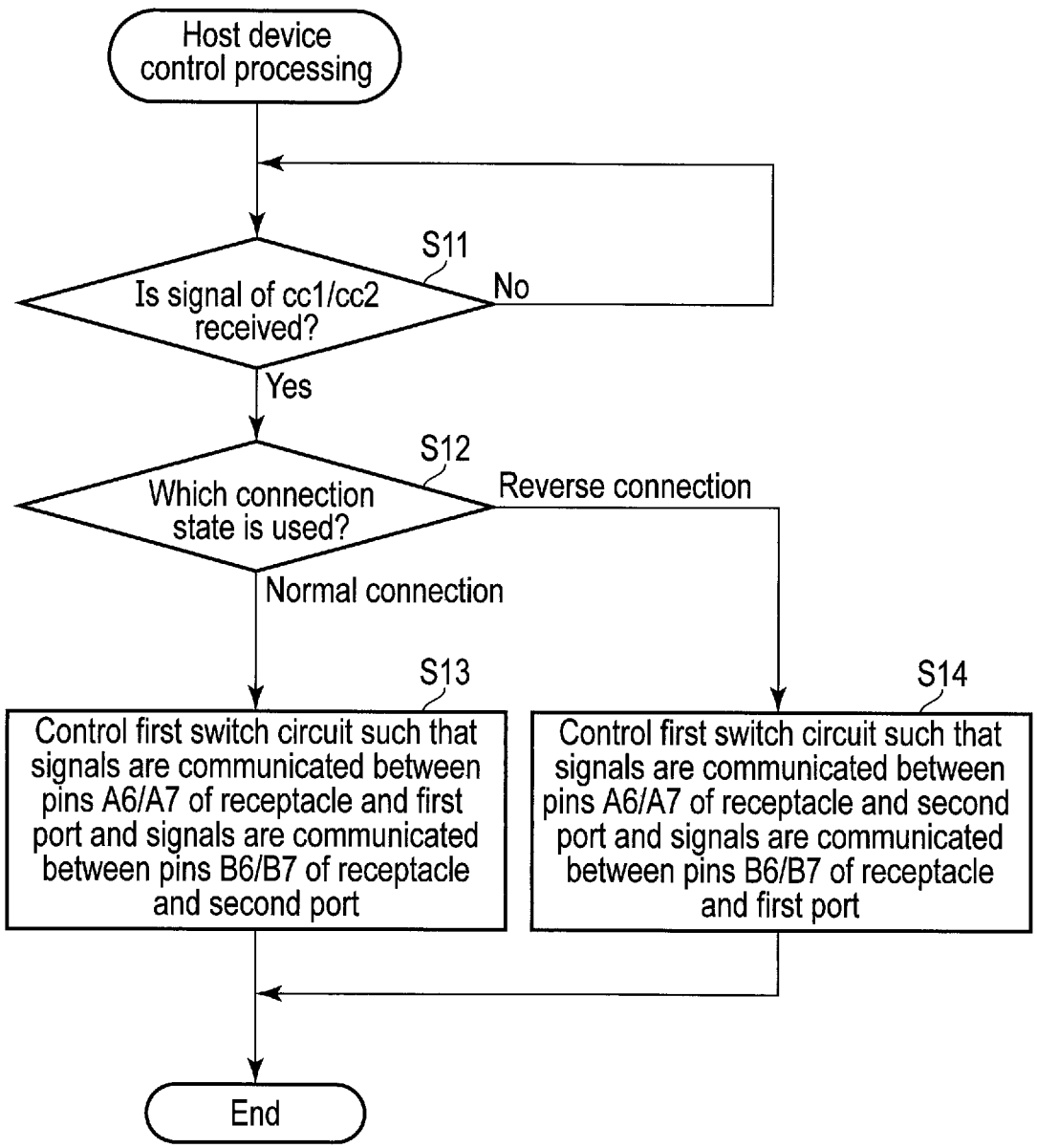
FIG. 13 is a flowchart of an example of the procedure of a control processing performed by a host in the control system of the first embodiment.

Now, an example of control processing performed by the host device 1 will be explained with reference to the flowchart of FIG. 13.

Initially, the host device 1 determines whether signals cc1/cc2 are received from pins A5/B5 of the receptacle 11 (step S11). Then, based on the signals cc1/cc2 received, the host device 1 determines whether the receptacle 11 and the plug 31 are connected in the normal connection or in the reverse connection (step S12).

When the receptacle 11 and the plug 31 are connected in the normal connection (normal connection in step S12), the host device 1 controls a first switch circuit SW1 such that the signals are communicated between pins A6/A7 of the receptacle 11 and a first USB 2.0 port 171, and the signals are communicated between pins B6/B7 of the receptacle 11 and a second USB 2.0 port 172 (step S13).

On the other hand, when the receptacle 11 and the plug 31 are connected in the reverse connection (reverse connection in step S12), the host device 1 controls the first switch circuit SW1 such that the signals are communicated between pins A6/A7 of the receptacle 11 and the second USB 2.0 port 172, and the signals are communicated between pins B6/B7 of the receptacle 11 and the first USB 2.0 port 171 (step S14).

Figure 14:
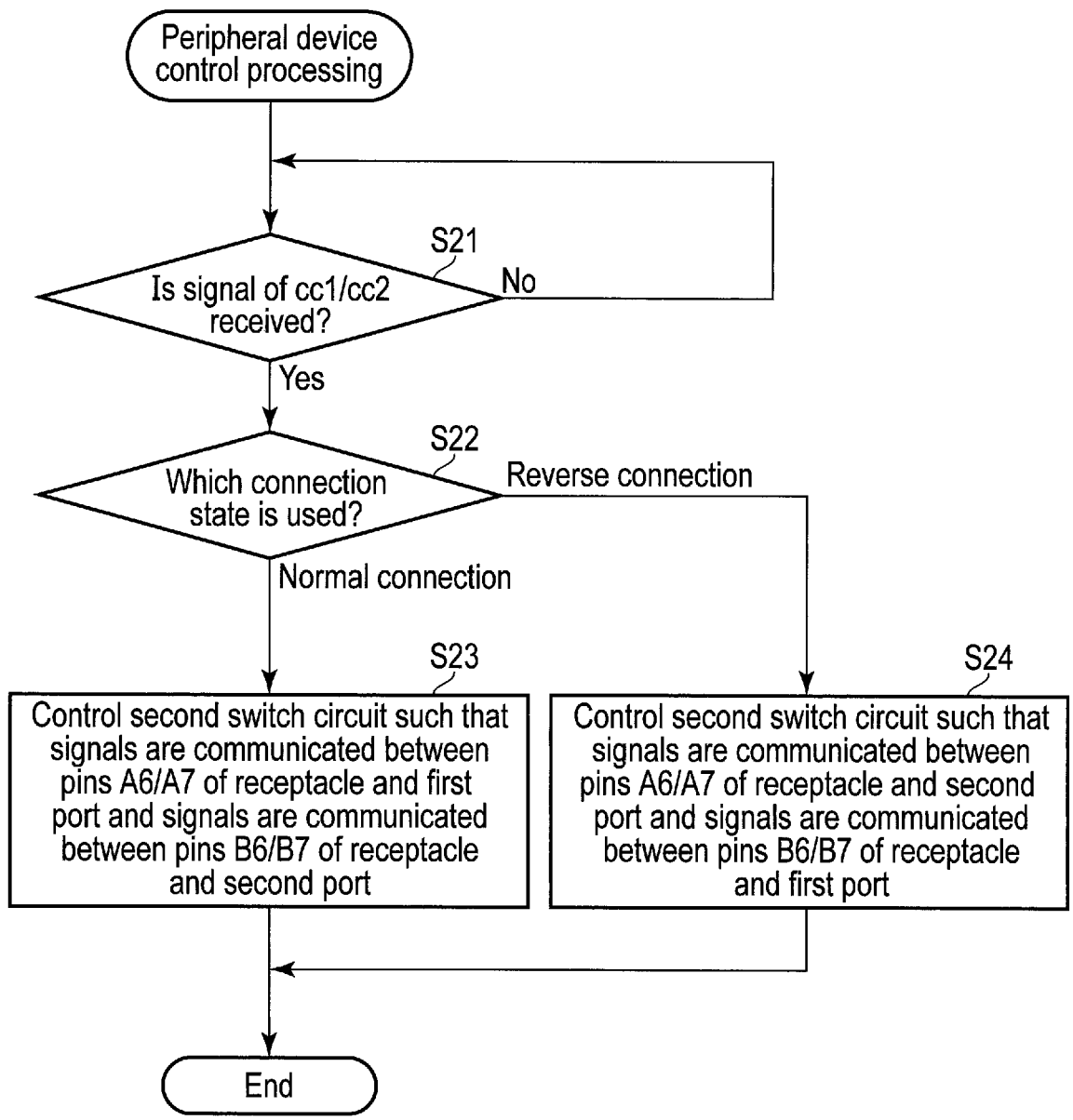
FIG. 14 is a flowchart of an example of the procedure of a control processing performed by a peripheral device in the control system of the first embodiment.

Now, an example of control processing performed by the peripheral device 2 will be explained with reference to the flowchart of FIG. 14.

Initially, the peripheral device 2 determines whether signals cc1/cc2 are received from pins A5/B5 of the receptacle 21 (step S21). Then, based on the signals cc1/cc2 received, the peripheral device 2 determines whether the receptacle 21 and the plug 33 are connected in the normal connection or in the reverse connection (step S22).

When the receptacle 21 and the plug 33 are connected in the normal connection (normal connection in step S22), the peripheral device 2 controls a second switch circuit SW2 such that the signals are communicated between pins A6/A7 of the receptacle 21 and a first USB 2.0 device 271, and the signals are communicated between pins B6/B7 of the receptacle 21 and a second USB 2.0 device 272 (step S23).

On the other hand, when the receptacle 21 and the plug 33 are connected in the reverse connection (reverse connection in step S22), the peripheral device 2 controls the second switch circuit SW2 such that the signals are communicated between pins A6/A7 of the receptacle 21 and the second USB 2.0 device 272, and the signals are communicated between pins B6/B7 of the receptacle 21 and the first USB 2.0 device 271 (step S24).

With the above-described structure, multiple USB 2.0 ports can be used while reducing the power. In the plugs 31 and 33 of the present embodiment, differential pair signals (D+ and D−) of USB 2.0 are newly assigned to pins B6/B7 to which no signal is assigned in the plugs 31A and 33A of USB Type-C standard. Furthermore, a wire that connects pin B6 of the plug 31 and pin B6 of the plug 33, and a wire that connects pin B7 of the plug 31 and pin B7 of the plug 33, are added to the cable body 32. Thus, not only one but two USB 2.0 ports can be used in the host device 1 without increasing the number of pins provided with the plugs and the receptacles from the number of pins (twenty four pins) defined by the USB Type-C standard.

Furthermore, the switch circuit SW1 provided with the host device 1 is switched such that the signals are communicated between one of pins A6/A7 and pins B6/B7 of the receptacle 11 and the USB 2.0 port 171, and the signals are communicated between the other of pins A6/A7 and pins B6/B7 of the receptacle 11 and the USB 2.0 port 172 in accordance with the orientation of the plug 31 inserted into the receptacle 11. Furthermore, the switch circuit SW2 provided with the peripheral device 2 is switched such that the signal is communicated between one of pins A6/A7 and pins B6/B7 of the receptacle 21 and the USB 2.0 device 271, and the signal is communicated between the other of pins A6/A7 and pins B6/B7 of the receptacle 21 and the USB 2.0 device 272 in accordance with the orientation of the plug 33 inserted into the receptacle 21. Thus, USB 2.0 signals can be communicated through routes that are suitable for the two USB port connections, respectively, regardless of the orientation of the plug 31 inserted into the receptacle 11 and the orientation of the plug 33 inserted into the receptacle 21.

Furthermore, since two USB 2.0 ports of the host device 1 are available, a hub controller IC 28 is not necessary in the peripheral device 2 to use two USB 2.0 devices 271 and 272. Furthermore, even if a hub controller IC 28 is provided to use three or more USB 2.0 devices 271, 272, and 273 in the peripheral device 2, the power saving effect can be increased by choosing two USB 2.0 ports 171 and 172. For example, the USB 2.0 device 271 which is frequently used is connected to one USB 2.0 port 171, and two USB 2.0 devices 272 and 273 which are infrequently used are connected to the other USB 2.0 port 172, and thus, a period of the power saving state of the hub controller IC 28 can be elongated, and the power can be saved.

(Second Embodiment)

In the first embodiment, the plug 31 of the cable 3 is inserted into the receptacle 11 of the host device 1 and the plug 33 of the cable 3 is inserted into the receptacle 21 of the peripheral device 2. In contrast, in the second embodiment, a plug 31 of a cable 3 is inserted into a receptacle 11 of a host device 1 while an USB 2.0 device 271 and a hub controller IC 28 are directly connected to the cable on the peripheral device 2 side. In other words, the peripheral device 2 includes a cable fixed to the peripheral device 2.

The structure of the control system of the second embodiment is the same as the control system of the first embodiment, and a difference between the first and second embodiments is that, in the second embodiment, the USB 2.0 device 271 and the hub controller IC 28 are directly connected to the cable in the peripheral device 2 side. Hereinafter, the different structure from the first embodiment will be explained.

In the example of FIGS. 15 and 16, one end of a cable 4 is fixed to the peripheral device 2 and a plug 31 is provided with the other end. The plug 31 is freely inserted into or detached from the receptacle 11 of the host device 1. The cable 4 includes the plug 31 and a cable body 32 as in the cable 3 of the first embodiment.

The USB 2.0 device 271 in the peripheral device 2 is connected to pins A6/A7 of the plug 31 via the cable body 32. That is, the USB 2.0 device 271 communicates with A6/A7 of the plug 31 by transmitting or receiving the signals.

The hub 28 in the peripheral device 2 is connected to pins B6/B7 of the plug 31 via the cable body 32. Two USB 2.0 devices 272 and 273 are connected to the hub 28. Thus, two USB 2.0 devices 272 and 273 are connected to pins B6/B7 of the plug 31 via the cable body 32 and the hub 28. That is, the USB 2.0 devices 272 and 273 communicates with pins B6/B7 of the plug 31 by transmitting or receiving the signals.

Furthermore, since the USB 2.0 device 271 and the hub controller IC 28 of the peripheral device 2 are directly connected to the cable 3, the peripheral device 2 does not include any switch. Note that, instead of the hub 28, one USB 2.0 device may be connected to pins B6/B7 of the plug 31.

FIG. 15 shows an example where the receptacle 11 and the plug 31 of the host device 1 are connected in the normal connection. The switch circuit SW1 detects that the receptacle 11 and the plug 31 are connected in the normal connection based on signals cc1/cc2 transmitted from pins A5/B5 (not shown in FIG. 15) of the receptacle 11. Because of the normal connection, the switch circuit SW1 is switched such that terminal A is connected to terminal C and terminal B is connected to terminal D. Thus, the signals are communicated between pins A6/A7 of the receptacle 11 and USB 2.0 port 171, and the signals are communicated between pins B6/B7 of the receptacle 11 and USB 2.0 port 172.

Furthermore, FIG. 16 shows an example where the receptacle 11 and the plug 31 are connected in the reverse connection. The switch circuit SW1 detects that the receptacle 11 and the plug 31 are connected in the reverse connection based on signals cc1/cc2 transmitted from pins A5/B5 (not shown in FIG. 16) of the receptacle 11. Because of the reverse connection, the switch circuit SW1 is switched such that terminal A is connected to terminal D and terminal B is connected to terminal C. Thus, the signals are communicated between pins A6/A7 of the receptacle 11 and USB 2.0 port 172, and the signals are communicated between pins B6/57 of the receptacle 11 and USB 2.0 port 171.

Even if the peripheral device 2 is fixed to the cable 4 as shown in FIGS. 15 and 16, that is, even if the USB 2.0 device and the hub 28 of the peripheral device 2 are directly connected to the cable 4, two USB 2.0 port connections can be used between the host device 1 and the peripheral device 2 as in the first embodiment.

Note that the switch circuit SW1 of the host device 1 may be omitted. For example, the switch circuit SW1 may be omitted in a case where correspondence between two USB 2.0 ports of the host device 1 and multiple USB 2.0 devices in the peripheral device 2 is not necessary to maintain in an indent system or the like for specific use (for example, POS system).

(Third Embodiment)

In the first embodiment, the plug 31 of the cable 3 is inserted into the receptacle 11 of the host device 1 and the plug 33 of the cable 3 is inserted into the receptacle 21 of the peripheral device 2. Furthermore, in the second embodiment, the plug 31 of the cable 4 is inserted into the receptacle 11 of the host device 1 while the USB 2.0 device 271 and the hub controller IC 28 are directly connected to the cable 4. The cables 3 and 4 each are formed based on a cable 3A of Type-C standard with a wire connecting between pins B6 and a wire between pins B7.

In contrast, in the third embodiment, a host device 1 and a peripheral device conforming to the USB Type-C standard are connected via the cable 3A of USB Type-C standard. That is, the receptacle 11 of the host device 1 and a plug 31A of the cable 3A are connected, and a receptacle 21 of a peripheral device of USB Type-C standard and a plug 33A of the cable 3A are connected.

The structure of the host device 1 of the control system of the third embodiment is the same as the host device 1 of the control system of the first and second embodiments, and a difference between the third embodiment and the first and second embodiments is that, in the third embodiment, a peripheral device of USB Type-C standard is connected to the host device 1 via the cable 3A of USB Type-C standard. Hereinafter, the different structure from the first and embodiments will be explained.

In the example shown in FIGS. 17 to 20, a peripheral device 2A of USB Type-C standard includes one USB 2.0 device 271. The USB 2.0 device 271 communicates with pins A6/A7 of the receptacle 21 by transmitting or receiving signals, and communicates with pins B6/B7 of the receptacle 21 by transmitting or receiving signals. On the peripheral device 2A side, signals of pins A6 and B6 which are directly connected on the PCB, and signals of pins A7 and B7 which are directly connected on the PCB, are used as signals for the USB 2.0 device 271.

Furthermore, the cable 3A connecting the host device 1 and the peripheral device 2A is a cable of USB Type-C standard. Thus, while pins A6/A7 of the plug 31A and pins A6/A7 of the plug 33 are connected, pins B6/B7 of the plug 31 and pins B6/B7 of the plug 33A are not connected (are open). That is, pin B6 of the plug 31A and pin B6 of the plug 33A are disconnected, and pin B7 of the plug 31A and pin B7 of the plug 33A are disconnected.

Figure 17:
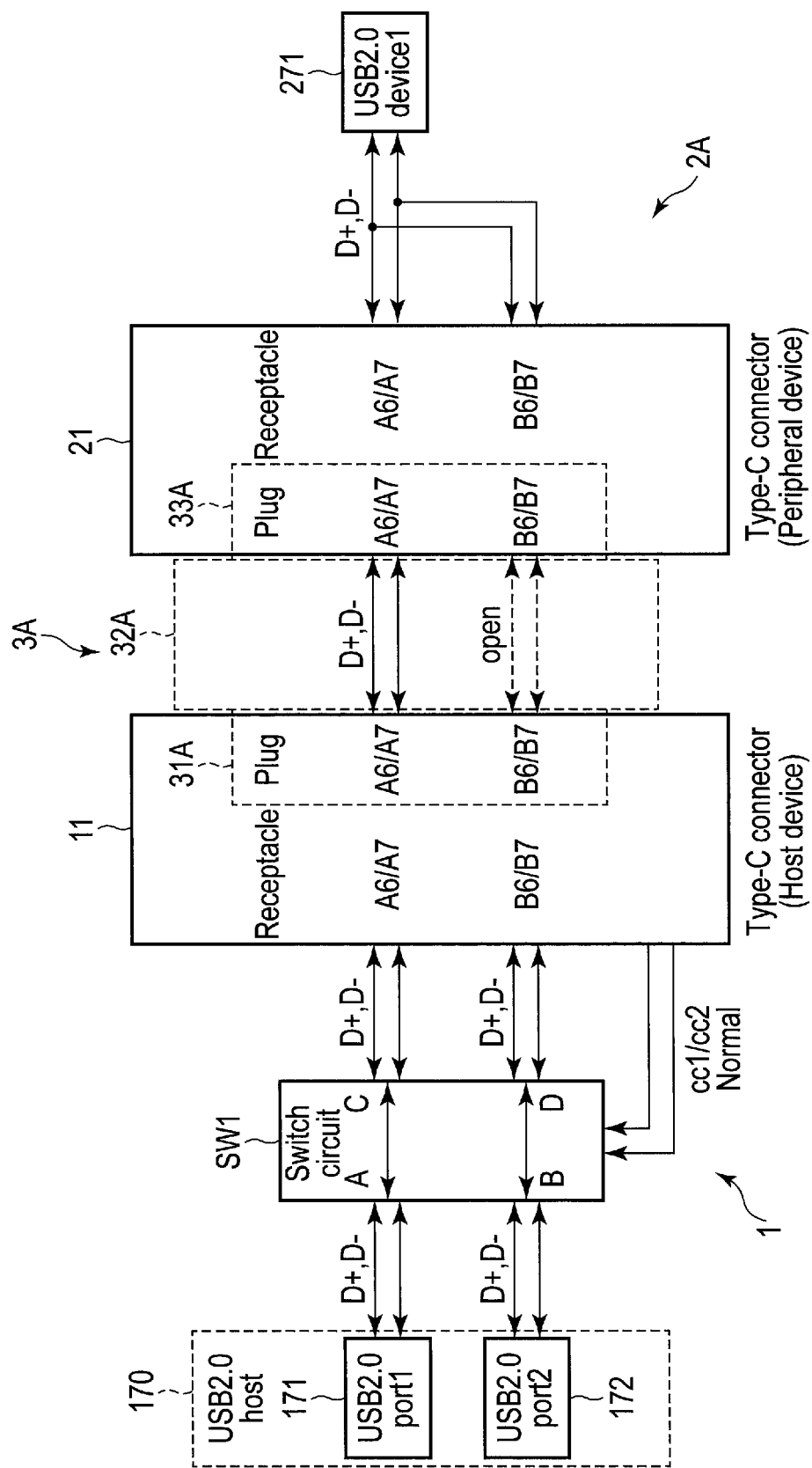
FIG. 17 is a block diagram of an example of normal-normal connection using a cable of USB Type-C standard in a control system of a third embodiment.

FIG. 17 shows an example where, the receptacle 11 and the plug 31A are connected in the normal connection in the Type-C connector on the host device 1 side, and the receptacle 21 and the plug 33A are connected in the normal connection in the Type-C connector on the peripheral device 2A side.

On the peripheral device 2A side, pins A6/A7 of the receptacle 21 are connected to pins A6/A7 of the plug 33A, and pins B6/B7 of the receptacle 21 are connected to pins B6/B7 of the plug 33A. As described above, the signals are communicated between pins A6/A7 of the receptacle 21 and USB 2.0 device 271, and the signals are communicated between pins B6/B7 of the receptacle 21 and USB 2.0 device 271.

On the host device 1 side, pins A6/A7 of the receptacle 11 are connected to pins A6/A7 of the plug 31A and pins B6/B7 of the receptacle 11 are connected to pins B6/B7 of the plug 31A. The switch circuit SW1 detects that the receptacle 11 and the plug 31A are connected in the normal connection based on the signals cc1/cc2 transmitted from pins A5/B5 (not shown in FIG. 17) of the receptacle 11. Because of the normal connection, the switch circuit SW1 is switched such that terminal A is connected to terminal C and terminal B is connected to terminal D. Thus, the signals are communicated between pins A6/A7 of the receptacle 11 and USB 2.0 port 171, and the signals are communicated between pins B6/B7 of the receptacle 11 and USB 2.0 port 172.

Thus, in the example of FIG. 17, the signals can be communicated between the USB 2.0 port 171 and the USB 2.0 device 271 via the wire connecting pins A6/A7 of the plug 31A and pins A6/A7 of the plug 33A and the switch circuit SW1 connecting the terminals A and C.

Figure 18:
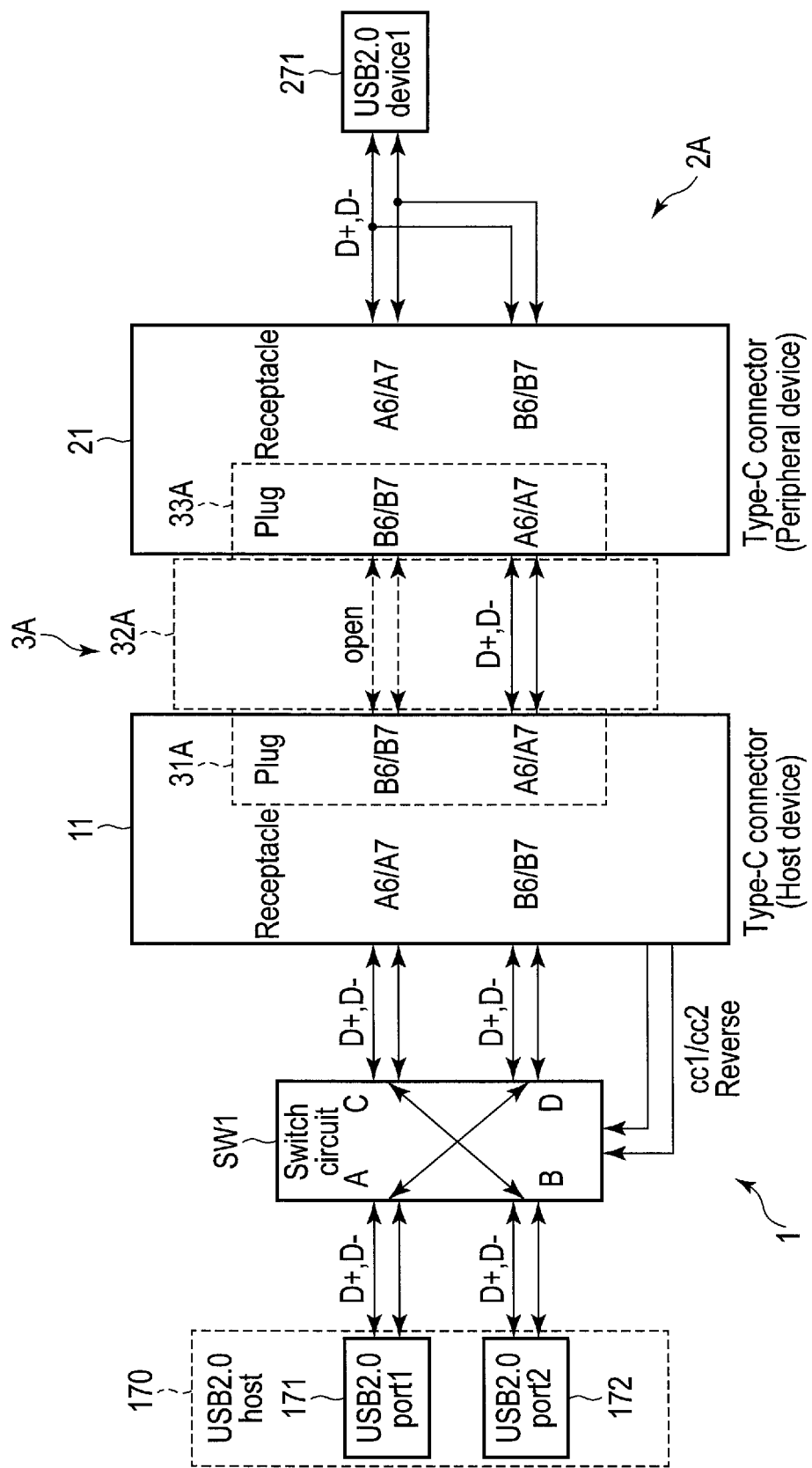
FIG. 18 is a block diagram of an example of reverse-reverse connection using the cable of USB Type-C standard in the control system of the third embodiment.

FIG. 18 shows an example where the receptacle 11 and the plug 31A are connected in the reverse connection in the Type-C connector on the host device 1 side, and the receptacle 21 and the plug 33A are connected in the reverse connection in the Type-C connector on the peripheral device 2A side.

On the peripheral device 2A side, pins A6/A7 of the receptacle 21 are connected to pins B6/B7 of the plug 33A, and pins B6/B7 of the receptacle 21 are connected to pins A6/A7 of the plug 33A. As described above, the signals are communicated between pins A6/A7 of the receptacle 21 and USB 2.0 device 271, and the signals are communicated between pins B6/B7 of the receptacle 21 and USB 2.0 device 271.

On the host device 1 side, pins A6/A7 of the receptacle 11 are connected to pins B6/B7 of the plug 31A and pins B6/B7 of the receptacle 11 are connected to pins A6/A7 of the plug 31A. The switch circuit SW1 detects that the receptacle 11 and the plug 31A are connected in the reverse connection based on the signals cc1/cc2 transmitted from pins A5/B5 (not shown in FIG. 18) of the receptacle 11. Because of the reverse connection, the switch circuit SW1 is switched such that terminal A is connected to terminal D and terminal B is connected to terminal C. Thus, the signals are communicated between pins A6/A7 of the receptacle 11 and USB 2.0 port 172, and the signals are communicated between pins B6/B7 of the receptacle 11 and USB 2.0 port 171.

Thus, in the example of FIG. 18, the signals can be communicated between the USB 2.0 port 171 and the USB 2.0 device 271 via the wire connecting pins A6/A7 of the plug 31A and pins A6/A7 of the plug 33A and the switch circuit SW1 connecting the terminals A and D.

FIG. 19 shows an example where the receptacle 11 and the plug 31A are connected in the normal connection in the Type-C connector on the host device 1 side, and the receptacle 21 and the plug 33A are connected in the reverse connection in the Type-C connector on the peripheral device 2A side.

On the peripheral device 2A side, pins A6/A7 of the receptacle 21 are connected to pins B6/B7 of the plug 33A, and pins B6/B7 of the receptacle 21 are connected to pins A6/A7 of the plug 33A. As described above, the signals are communicated between pins A6/A7 of the receptacle 21 and USB 2.0 device 271, and the signals are communicated between pins B6/B7 of the receptacle 21 and USB 2.0 device 271.

On the host device 1 side, pins A6/A7 of the receptacle 11 are connected to pins A6/A7 of the plug 31A and pins B6/B7 of the receptacle 11 are connected to pins B6/B7 of the plug 31A. The switch circuit SW1 detects that the receptacle 11 and the plug 31A are connected in the normal connection based on the signals cc1/cc2 transmitted from pins A5/B5 (not shown in FIG. 19) of the receptacle 11. Because of the normal connection, the switch circuit SW1 is switched such that terminal A is connected to terminal C and terminal B is connected to terminal D. Thus, the signals are communicated between pins A6/A7 of the receptacle 11 and USB 2.0 port 171, and the signals are communicated between pins B6/B7 of the receptacle 11 and USB 2.0 port 172.

Thus, in the example of FIG. 19, the signals can be communicated between the USB 2.0 port 171 and the USB 2.0 device 271 via the wire connecting pins A6/A7 of the plug 31A and pins A6/A7 of the plug 33A and the switch circuit SW1 connecting the terminals A and C.

FIG. 20 shows an example where the receptacle 11 and the plug 31A are connected in the reverse connection in the Type-C connector on the host device 1 side, and the receptacle 21 and the plug 33A are connected in the normal connection in the Type-C connector on the peripheral device 2A side.

On the peripheral device 2A side, pins A6/A7 of the receptacle 21 are connected to pins A6/A7 of the plug 33A, and pins B6/B7 of the receptacle 21 are connected to pins B6/B7 of the plug 33A. As described above, the signals are communicated between pins A6/A7 of the receptacle 21 and USB 2.0 device 271, and the signals are communicated between pins B6/B7 of the receptacle 21 and USB 2.0 device 271.

On the host device 1 side, pins A6/A7 of the receptacle 11 are connected to pins B6/B7 of the plug 31A and pins B6/B7 of the receptacle 11 are connected to pins A6/A7 of the plug 31A. The switch circuit SW1 detects that the receptacle 11 and the plug 31A are connected in the reverse connection based on the signals cc1/cc2 transmitted from pins A5/B5 (not shown in FIG. 20) of the receptacle 11. Because of the reverse connection, the switch circuit SW1 is switched such that terminal A is connected to terminal D and terminal B is connected to terminal C. Thus, the signals are communicated between pins A6/A7 of the receptacle 11 and USB 2.0 port 172, and the signals are communicated between pins B6/B7 of the receptacle 11 and USB 2.0 port 171.

Thus, in the example of FIG. 20, the signals can be communicated between the USB 2.0 port 171 and the USB 2.0 device 271 via the wire connecting pins A6/A7 of the plug 31A and pins A6/A7 of the plug 33A and the switch circuit SW1 connecting the terminals A and D.

As can be understood from the above, even if a peripheral device 2A of USB Type-C standard is connected to a host device 1 including a switch circuit SW1 via a cable 3 of USB Type-C standard, conventional USB 2.0 port connection can be achieved.

As described above, in the first to third embodiments, multiple USB 2.0 ports are available while the power is reduced. In the host device 1, the receptacle 11 includes multiple pins. The plug 31 including multiple pins is insertable into the receptacle 11. USB 2.0 port 171 communicates with the receptacle 11 by transmitting or receiving a first signal. USB 2.0 port 172 communicates with the receptacle 11 by transmitting or receiving a second signal. When the plug 31 is inserted into the receptacle 11, the switch circuit SW1 switches a signal flow between the receptacle, and the first port and second port. The switch circuit SW1 communicates the first signal between USB 2.0 port 171 and one of a pair of pins A6/A7 and a pair of pins B6/B7 of the receptacle 11, and communicates the second signal between USB 2.0 port 172 and the other of the pair of pins A6/A7 and the pair of pins B6/B7 of the receptacle 11.

Thus, in the host device 1, USB 2.0 signals are communicated via two routes between USB 2.0 ports 171 and 172 and the plug 31 inserted into the receptacle 11. Thus, for example, multiple USB port connections can be used between the USB 2.0 ports 171 and 172 and USB devices 271 and 272 of the peripheral device 2 without providing a hub 28, and thus, power saving can be achieved.

Furthermore, in the peripheral device 2, the receptacle 21 includes multiple pins. The plug 33 including multiple pins is insertable into the receptacle 21. USB 2.0 device 271 communicates with the receptacle 21 by transmitting or receiving a first signal. USB 2.0 device 272 communicates with the receptacle 21 by transmitting or receiving a second signal. The switch circuit SW2 switches a signal flow between the receptacle, and USB 2.0 device 271 and USB 2.0 device 272. The switch circuit SW2 communicates the first signal between USB 2.0 device 271 and one of a pair of pins A6/A7 and a pair of pins B6/B7 of the receptacle 21, and communicates the second signal between USB 2.0 device 272 and the other of the pair of pins A6/A7 and the pair of pins B6/B7 of the receptacle 21.

Thus, in the peripheral device 2, USB 2.0 signals are communicated via two routes between USB 2.0 devices 271 and 272 and the plug 33 inserted into the receptacle 21. Thus, for example, multiple USB port connections can be used between the USB 2.0 ports 171 and 172 of the host device 1 and USB devices 271 and 272 of the peripheral device 2 without providing a hub 28, and thus, power saving can be achieved.

Various functions described in the embodiments may be realized by a circuit (processing circuit). The processing circuit may be a programmed processor such as a central processing unit (CPU). The processor executes computer program (command group) stored in a memory to perform the functions in the embodiments. Such a processor may be a microprocessor including an electric circuit. The processing circuit may be a digital signal processor (DSP), application-specific integrated circuit (ASIC), microcontroller, controller, or any other electric circuit component. Components other than CPU described in the embodiments may be realized by a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a receptacle comprising first upper pins and first lower pins, wherein the first upper pins are arranged symmetrically and include at least a ground pin, a data pin, a power pin, and a configuration pin, the first lower pins are arranged symmetrically and include at least a ground pin, a data pin, a power pin, and a configuration pin, wherein the receptacle and a plug are connected in a normal connection or in a reverse connection, the plug comprises upper pins and lower pins, and an arrangement of the first upper pins and the first lower pins corresponds to an arrangement of the upper pins and the lower pins of the plug;
a first port that communicates with the receptacle by transmitting or receiving a first signal;
a second port that communicates with the receptacle by transmitting or receiving a second signal; and
a switch circuit that is disposed between the receptacle, and the first port and second port, performs first switching control when detecting that the receptacle and the plug are connected in the normal connection based on a configuration channel signal received from at least one of the configuration pin of the first upper pins and the configuration pin of the first lower pins, and performs second switching control when detecting the receptacle and the plug are connected in the reverse connection based on the configuration channel signal,
wherein performing the first switch control comprises communicating the first signal between the first port and the first upper pins and communicating the second signal between the second port and the first lower pins, and
performing the second switch control comprises communicating the first signal between the first port and the first lower pins and communicating the second signal between the second port and the first upper pins.

2. The electronic device of claim 1, wherein
the electronic device is connected to a second electronic device via a cable comprising a first plug at one end and a second plug at the other end,
two of lower pins of the first plug, which are arranged symmetrically, are assigned to a first data pin and a second data pin for differential pair signals, respectively,
two of lower pins of the second plug, which are arranged symmetrically, are assigned to a first data pin and a second data pin for differential pair signals, respectively, and
the cable further comprises
a first wire that connects the first data pin of the first plug and the first data pin of the second plug, and
a second wire that connects the second data pin of the first plug and the second data pin of the second plug.

3. The electronic device of claim 2, wherein
a differential pair signal of universal serial bus (USB) 2.0 standard is assigned to each of, a pair of the first data pin for a first differential signal and the second data pin for a second differential signal of the first plug, and a pair of the first data pin for the first differential signal and the second data pin for the second differential signal of the second plug.

4. The electronic device of claim 1, wherein
each of the first port and the second port is a port of universal serial bus (USB) 2.0 standard, and
the receptacle comprises a receptacle interface of universal serial bus (USB) Type-C standard.

5. An electronic device comprising:
a receptacle comprising first upper pins and first lower pins, wherein the first upper pins are arranged symmetrically and include at least a ground pin, a data pin, a power pin, and a configuration pin, the first lower pins are arranged symmetrically and include at least a ground pin, a data pin, a power pin, and a configuration pin, wherein the receptacle and a plug are connected in a normal connection or in a reverse connection, the plug comprises upper pins and lower pins, and an arrangement of the first upper pins and the first lower pins corresponds to an arrangement of the upper pins and the lower pins of the plug;
a first device that communicates with the receptacle by transmitting or receiving a first signal;
a second device that communicates with the receptacle by transmitting or receiving a second signal; and a switch circuit that is disposed between the receptacle, and the first device and the second device, performs first switching control when detecting that the receptacle and the plug are connected in the normal connection based on a configuration channel signal received from at least one of the configuration pin of the first upper pins and the configuration pin of the first lower pins, and performs second switching control when detecting the receptacle and the plug are connected in the reverse connection based on the configuration channel signal, wherein performing the first switch control comprises communicating the first signal between the first device and the first upper pins, and communicating the second signal between the second device and the first lower pins, and performing the second switch control comprises communicating the first signal between the first device and the first lower pins and communicating the second signal between the second device and the first upper pins.

6. The electronic device of claim 5, wherein the electronic device is connected to a second electronic device via a cable comprising a first plug at one end and a second plug at the other end, two of lower pins of the first plug, which are arranged symmetrically, are assigned to a first data pin and a second data pin for differential pair signals, respectively, two of lower pins of the second plug, which are positioned symmetrically, are assigned to a first data pin and a second data pin for differential pair signals, respectively, and the cable further comprises a first wire that connects the first data pin of the first plug and the first data pin of the second plug, and a second wire that connects the second data pin of the first plug and a the second data pin of the second plug.

7. The electronic device of claim 6, wherein a differential pair signal of universal serial bus (USB) 2.0 standard is assigned to each of a pair of the first data pin for a first differential signal and the second data pin for a second differential signal of the first plug, and a pair of the first data pin for the first differential signal and the second data pin for the second differential signal of the second plug.

8. The electronic device of claim 5, wherein each of the first device and the second device comprises a device of universal serial bus (USB) 2.0 standard, and the receptacle comprises a receptacle interface of universal serial bus (USB) Type-C standard.

9. A control system comprising:

a first electronic device;

a second electronic device; and a cable connecting the first and second electronic devices, wherein the cable comprises a first plug and a second plug each comprising upper pins and lower pins, wherein the upper pins are arranged symmetrically and include at least a ground pin, a data pin, a power pin, and a configuration pin, the lower pins are arranged symmetrically and include at least a ground pin, a data pin, and a power pin, the first electronic device comprises a first receptacle comprising first upper pins and first lower pins, wherein the first upper pins include at least a ground pin, a data pin, a power pin, and a configuration pin, the first lower pins include at least a ground pin, a data pin, a power pin, and a configuration pin, an arrangement of the first upper pins and the first lower pins correspond to an arrangement of the upper pins and the lower pins of the first plug, and the first receptacle and the first plug are connected in a normal connection or in a reverse connection, a first port that communicates with the first receptacle by transmitting or receiving a first signal, a second port that communicates with the first receptacle by transmitting or receiving a second signal, and a first switch circuit that is disposed between the first receptacle, and the first port and the second port, performs first switching control when detecting that the first receptacle and the first plug are connected in the normal connection based on a first configuration channel signal received from at least one of the configuration pin of the first upper pins and the configuration pin of the first lower pins, and performs second switching control when detecting the first receptacle and the first plug are connected in the reverse connection based on the first configuration channel signal, wherein performing the first switch control comprises communicating the first signal between the first port and the first upper pins and communicating the second signal between the second port and the first lower pins, and performing the second switch control comprises communicating the first signal between the first port and the first lower pins and communicating the second signal between the second port and the first upper pins, and the second electronic device comprises a second receptacle comprising second upper pins and second lower pins, wherein the second upper pins include at least a ground pin, a data pin, a power pin, and a configuration pin, the second lower pins include at least a ground pin, a data pin, a power pin, and a configuration pin, an arrangement of the second upper pins and the second lower pins correspond to the arrangement of the upper pins and the lower pins of the second plug, and the second receptacle and the second plug are connected in the normal connection or in the reverse connection, a first device that communicates with the second receptacle by transmitting or receiving a third signal, a second device that communicates with the second receptacle by transmitting or receiving a fourth signal, and a second switch circuit that is disposed between the second receptacle, and the first device and the second device, performs third switching control when detecting that the second receptacle and the second plug are connected in the normal connection based on a second configuration channel signal received from at least one of the configuration pin of the second upper pins and the configuration pin of the second lower pins, and performs fourth switching control when detecting the second receptacle and the second plug are connected in the reverse connection based on the second configuration channel signal, wherein performing the third switch control comprises communicating the third signal between the first device and the second upper pins and communicating the fourth signal between the second device and the second lower pins, and performing the fourth switch control comprises communicating the third signal between the first device and the second lower pins and communicating the fourth signal between the second device and the second upper pins.

10. The control system of claim 9, wherein two of lower pins of the first plug, which are arranged symmetrically, are assigned to a first data pin and a second data pin for differential pair signals, respectively, two of lower pins of the second plug, which are arranged symmetrically, are assigned to a first data pin and a second data pin for differential pair signals, respectively, and the cable further comprises a first wire that connects the first data pin of the first plug and the first data pin of the second plug, and a second wire that connects the second data pin of the first plug and the second data pin of the second plug.

11. The control system of claim 10, wherein a differential pair signal of universal serial bus (USB) 2.0 standard is assigned to each of a pair of the first data pin for a first differential signal and the second data pin for a second differential signal of the first plug, and a pair of the first data pin for the first differential signal and the second data pin for the second differential signal of the second plug.

12. The control system of claim 9, wherein each of the first port and the second port comprises a port of universal serial bus (USB) 2.0 standard, each of the first device and the second device comprises a device of universal serial bus (USB) 2.0 standard, and each of the first receptacle and the second receptacle comprises a receptacle interface of universal serial bus (USB) Type-C standard.

13. A control system comprising:

a first electronic device; and a second electronic device that comprises a cable, wherein the cable comprises a plug comprising upper pins and lower pins, wherein the upper pins are arranged symmetrically, the lower pins are arranged symmetrically, the upper pins include at least a ground pin, a data pin, a power pin, and a configuration pin, and the lower pins include at least a ground pin, a data pin, and a power pin, the first electronic device comprises a receptacle comprising first upper pins and first lower pins, wherein the first upper pins include at least a ground pin, a data pin, a power pin, and a configuration pin, the first lower pins include at least a ground pin, a data pin, a power pin, and a configuration pin, an arrangement of the first upper pins and the first lower pins correspond to an arrangement of the upper pins and the lower pins of the plug, and the receptacle and the plug are connected in a normal connection or in a reverse connection, a first port that communicates with the receptacle by transmitting or receiving a first signal, a second port that communicates with the receptacle by transmitting or receiving a second signal, and a switch circuit that is disposed between the receptacle, and the first port and the second port, performs first switching control when detecting that the receptacle and the plug are connected in the normal connection based on a configuration channel signal received from at least one of the configuration pin of the first upper pins and the configuration pin of the first lower pins, and performs second switching control when detecting the receptacle and the plug are connected in the reverse connection based on the configuration channel signal, wherein performing the first switch control comprises communicating the first signal between the first port and the first upper pins and communicating the second signal between the second port and the first lower pins, performing the second switch control comprises communicating the first signal between the first port and the first lower pins and communicating the second signal between the second port and the first upper pins, and the second electronic device comprises a first device that communicates with the upper pins of the plug by transmitting or receiving a third signal, and a second device that communicates with the lower pins of the plug by transmitting or receiving a fourth signal.

14. The control system of claim 13, wherein two of the lower pins of the plug, which are arranged symmetrically, are assigned to a first data pin and a second data pin for differential pair signals, respectively.

15. The control system of claim 13, wherein a differential pair signal of universal serial bus (USB) 2.0 standard is assigned to a pair of the first data pin for a first differential signal and the second data pin for a second differential signal of the plug.

16. The control system of claim 13, wherein each of the first port and the second port comprises a port of universal serial bus (USB) 2.0 standard, each of the first device and the second device comprises a device of universal serial bus (USB) 2.0 standard, and the receptacle comprises a receptacle interface of universal serial bus (USB) Type-C standard.

17. The control system of claim 13, wherein the second electronic device further comprises a hub controller, and two devices of universal serial bus (USB) 2.0 standard are further connected to the hub controller.

* * * * *